INVENTOR
EARL H. SCHOENFELD
BY H. S. Grover
ATTORNEY

July 18, 1950 E. H. SCHOENFELD 2,515,613
TIMER AND SYNCHRONIZING SIGNAL GENERATOR
Filed July 11, 1946 13 Sheets-Sheet 2

INVENTOR
EARL H. SCHOENFELD
BY H. S. Grace
ATTORNEY

July 18, 1950 E. H. SCHOENFELD 2,515,613

TIMER AND SYNCHRONIZING SIGNAL GENERATOR

Filed July 11, 1946 13 Sheets-Sheet 3

INVENTOR
EARL H. SCHOENFELD
BY W. S. Grace.
ATTORNEY

INVENTOR
EARL H. SCHOENFELD
BY H. S. Grace
ATTORNEY

July 18, 1950 E. H. SCHOENFELD 2,515,613

TIMER AND SYNCHRONIZING SIGNAL GENERATOR

Filed July 11, 1946 13 Sheets-Sheet 5

INVENTOR
EARL H. SCHOENFELD

BY H. S. Grover.

ATTORNEY

INVENTOR
EARL H. SCHOENFELD
BY [signature]
ATTORNEY

TIMER AND SYNCHRONIZING SIGNAL GENERATOR

Filed July 11, 1946 13 Sheets-Sheet 7

INVENTOR
EARL H. SCHOENFELD
BY
ATTORNEY

TIMER AND SYNCHRONIZING SIGNAL GENERATOR

Filed July 11, 1946

13 Sheets-Sheet 8

INVENTORS
EARL H. SCHOENFELD
BY W. S. Grace
ATTORNEY

INVENTOR
EARL H. SCHOENFELD
BY H. G. Grover
ATTORNEY

TIMER AND SYNCHRONIZING SIGNAL GENERATOR

Filed July 11, 1946

INVENTOR
EARL H. SCHOENFELD
BY W. S. Grover
ATTORNEY

TIMER AND SYNCHRONIZING SIGNAL GENERATOR

Filed July 11, 1946 13 Sheets-Sheet 11

INVENTOR
EARL H. SCHOENFELD
BY H. S. Grover
ATTORNEY

TIMER AND SYNCHRONIZING SIGNAL GENERATOR

Filed July 11, 1946 13 Sheets-Sheet 12

INVENTOR
EARL H. SCHOENFELD
BY W. S. Grover.
ATTORNEY

TIMER AND SYNCHRONIZING SIGNAL GENERATOR

Filed July 11, 1946

INVENTOR
EARL H. SCHOENFELD
BY H. S. Grover
ATTORNEY

Patented July 18, 1950 2,515,613

UNITED STATES PATENT OFFICE 2,515,613

TIMER AND SYNCHRONIZING SIGNAL GENERATOR

Earl H. Schoenfeld, Mamaroneck, N. Y., assignor to Radio Corporation of America, a corporation of Delaware Application July 11, 1946, Serial No. 682,738

19 Claims. (Cl. 178—69.5)

My invention relates in general to apparatus for developing electrical signals and more particularly to apparatus for developing equalizing, synchronizing, driving, and blanking signals for television apparatus.

In the art of television transmission it is necessary to synchronize accurately the action of the apparatus which is doing the scansion of the image televised and the action of the apparatus for reproducing the image. Presently known television apparatus usually accomplishes both the scansion and the reproduction of a televised image by means of a moving cathode ray beam which is moved line by line over a surface undergoing scansion in the case of the transmitter, and over a surface for reproducing the image in the case of the receiver. The back and forth movement of the electron beams at the transmitter and receiver demand a fine degree of synchronized operation. Accordingly it is one of the objects of my invention to provide apparatus for generating signals for accomplishing the proper synchronization between the movement of a cathode ray forming part of a transmission apparatus and the cathode ray beam forming part of a television receiving apparatus.

Usually scansion is accomplished in one direction of movement of the cathode ray beam only and the action of the cathode ray beam is negated during its return to the initial portion either of a line, or of a field, or a complete frame, in order to prevent the production of well known, undesired effects. This is accomplished by a "blanking" of the cathode ray beam during its return to an initial point from which scansion or reproduction then again takes place. Accordingly it is another of the objects of my invention to provide a method of, and apparatus for, develpeng proper blanking control signals for use both at the transmitter and at the receiver.

Apparatus for generating synchronizing, and blanking signals and equalizing signals and driving signals are well known to the prior art in the art to which this case pertains. This apparatus has, however, suffered from the disadvantage that it has been extremely difficult to maintain proper phasing between the various signals comprising the synchronizing, driving, blanking and equalizing signals. These disadvantages have been overcome in the present invention and accordingly it is another of the objects of my invention to provide a method of, and apparatus for generating such signals, for use in television apparatus in which the initiation thereof, or in other words the leading edge of each signal, will be generated under the control of repetitive signals having a definite fixed phase, and which therefore will insure correct phase relationships between the various signals developed.

The prior art to which this case belongs has heretofore attempted to fix the phase of each of the signals hereinbefore referred to by separately generating the signals and then combining them. Manual adjustments have been necessary in order to correct for inaccurate phasing of any of these signals. This is a delicate operation and it is not an absolutely stable operation. It is, therefore, another of the objects of my invention to provide an apparatus for generating synchronizing, blanking, and equalizing signals in which manual adjustments are substantially eliminated.

It is another of the objects of my invention to provide an apparatus for developing synchronizing and blanking signals which are definitely locked in together in phase.

It is a still further object of my invention to provide apparatus for developing synchronizing and blanking signals both for the transmission apparatus and the receiving apparatus.

Other objects will be apparent from a review of the subject matter set forth hereinafter.

In general my apparatus is particularly adaptable for developing synchronizing, equalizing, and blanking signals for use in an odd line interlaced type of television transmission. Present standards contemplate the use of 525 lines to the complete image with alternate line interlacing accomplished at the rate of 60 interlaced fields to the complete image, or a transmission speed of 30 complete images per second.

My invention contemplates the development of a series of fixed phase, very steep pulses of a frequency of 31,500 cycles (double the assumed line frequency), and the horizontal synchronizing pulses for both the transmitter and receiver, the vertical synchronizing pulses, the horizontal and vertical blanking pulses for the transmitter and receiver, and the equalizing signals, all are developed under the influence of this single recurring set of sharp pulses or pips of fixed phase.

The 31,500 cycle sharp pulses are impressed onto a delay line having a series of taps and hence there will appear at the various taps sets of pulses, or pips, having predetermined phase relationships, and having a very steep front. These pips are used in some instances to control the development of the trailing edge of some of the developed signals, and in all cases to initiate the development of the leading edge of the developed signals. Thus the relative initiation of all signals developed is both fixed, determinable, and constant.

The horizontal synchronizing signals for the receiver, the two sets of equalizing signals and the vertical synchronizing signals all are developed by a single signal generator under the control of the 31.5 k. c. pips from the delay line, thus assuring accuracy in relative phasing.

Further, apparatus is provided which, under the influence of the steep pulses taken from the delay line, will control the development of the proper number of equalizing and synchronizing pulses and this will be explained more fully hereinafter in this specification.

In addition to the apparatus for generating the horizontal synchronizing pulses for both the transmitter and receiver, the horizontal and vertical blanking pulses for the transmitter and receiver, and the equalizing signals, there is provided a timer unit which is adapted to generate a 31.5 k. c. sine wave signal and from this signal there is derived, by a set of frequency dividers, a 60 cycle signal having a definite phase relationship with that of the sine wave. The 60 cycle signal is then utilized to derive signals bearing a desired relationship to the field scansion frequency. The timer unit also provides among other signals, a 60 cycle rectangular pulse from the 60 cycle signal and having one of the components thereof of a predeterminable length which is substantially two scanning lines length in duration and which can be used to advantage in the synchronizing and blanking signal generator component of this invention. The timer also is arranged so that, if absolutely necessary, a 60 cycle power line input could be utilized in conjunction therewith.

My invention will best be understood by referring to the drawings, in which:

Fig. 1, parts (*a*) and (*b*) thereof, is a showing of a wave form relating to odd line interlacing and developed by linear scansion, which is present RMA standard;

Fig. 10, sections (*a*) and (*b*) thereof, is a circuit diagram of a timer unit in accordance with the invention;

Fig. 11, sections (*a*) to (*d*) thereof is a circuit diagram of the synchronizing and blanking generator.

Figure 1:
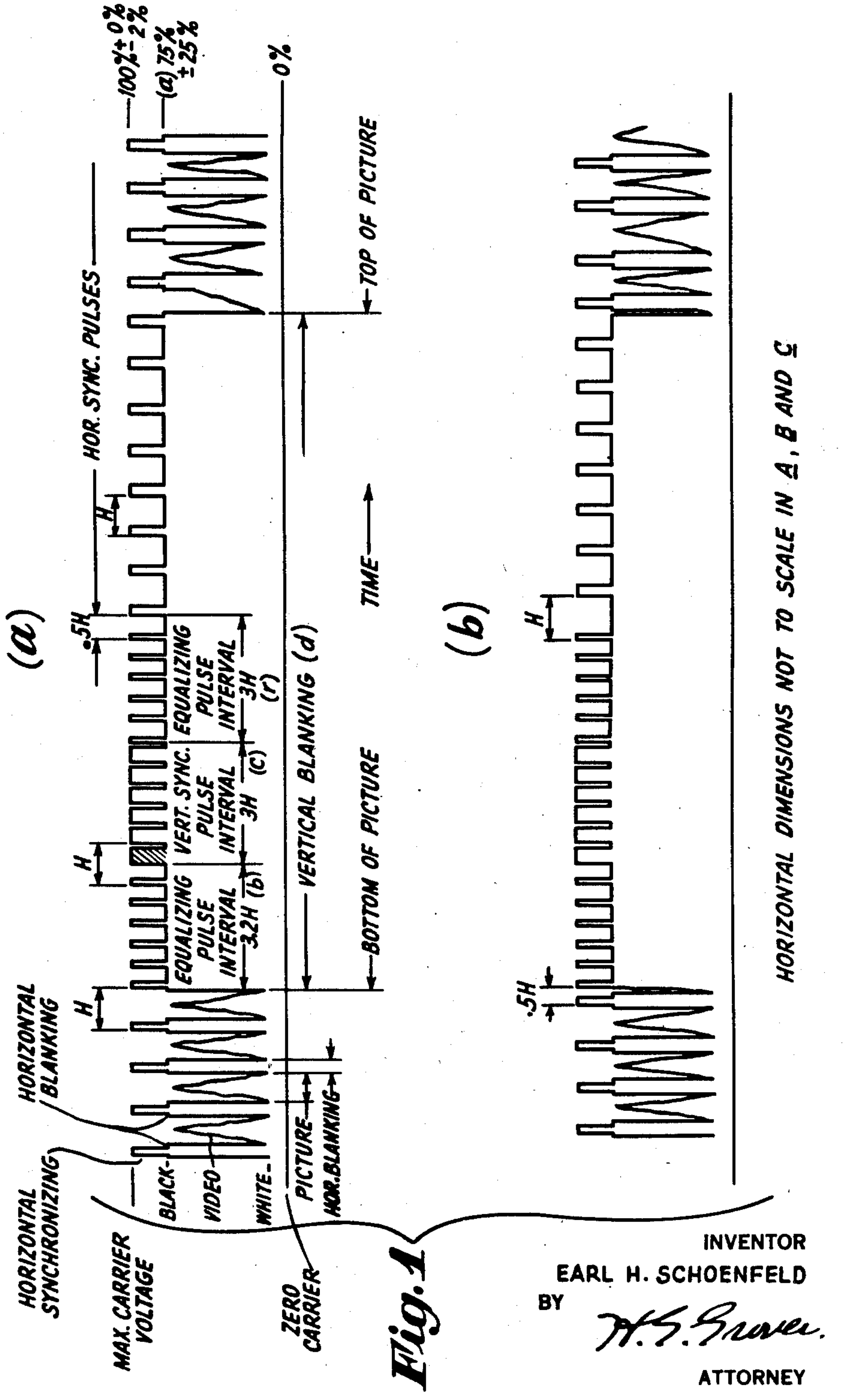

Referring to Fig. 1, parts (*a*) and (*b*) thereof, there is shown a representation of a portion of a transmitted televisional signal. The video components thereof are representative of a scanned line of television image. The complete signal contains horizontal synchronizing signals as well as video components, and for illustrative purposes there is shown also the vertical synchronizing signals developed at the end of the scansion of each scanned field. Equalizing, vertical synchronizing, and blanking signals are a component part of the latter signal. This is a form of transmission which meets present RMA standards.

In these curves a negative form of transmission is represented, that is to say that the smallest amplitude of carrier is radiated as a representation of picture white. The blanking level is indicated, and the horizontal synchronizing signals are transmitted simultaneously with the horizontal blanking signals, the two together forming a pedestal-like structure. Interposed between these signals is the picture or video signal. After each interlaced field there is transmitted a signal which comprises an equalizing pulse interval during which there are transmitted 6 equalizing signals, then a vertical synchronizing pulse interval during which 6 vertical synchronizing signals are transmitted, and a second equalizing pulse interval during which 6 equalizing pulses again are transmitted. Horizontal synchronizing signal transmission then is resumed before the scansion of a new field takes place and, at the end of the vertical blanking interval, linear scansion recommences.

The wave form has been shown in two portions identified as (*a*) and (*b*) to show relative phase relationships between the signals identified with each scanned field, it being assumed that an odd line interlaced form of scanning will take place. Since 525 scanned lines comprise the complete picture, and 60 interlaced fields are transmitted per second, there will be a phase displacement between the signals of the two fields comprising the complete picture.

Figure 2:
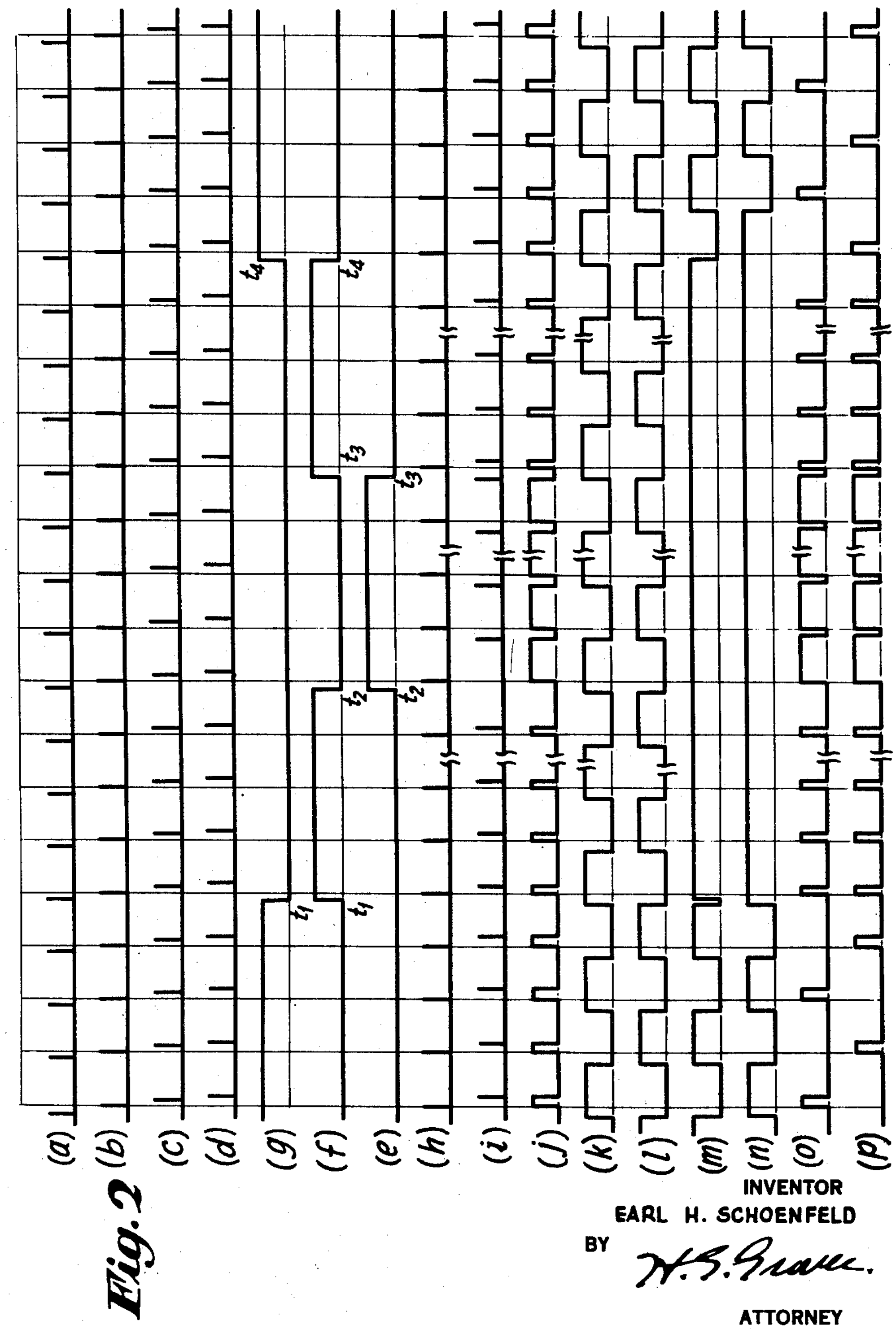
Fig. 2 is a set of explanatory curves showing the wave forms and phase relationship of various curves developed during the generation of the synchronizing, blanking, and equalizing signals.

Referring to Fig. 2 there is shown a set of explanatory curves showing various pulses developed in the generation of the synchronizing and equalizing signals transmitted, and indicating the phase relationships between the various signals making up this set. For purposes of clarity and ease of illustration, some of these curves have been broken away in parts and this has been indicated in the drawings. The derivation of these curves and their relationship each to the other will be explained more fully hereinafter in the specification in explaining the operation of the apparatus involved.

Figure 3:
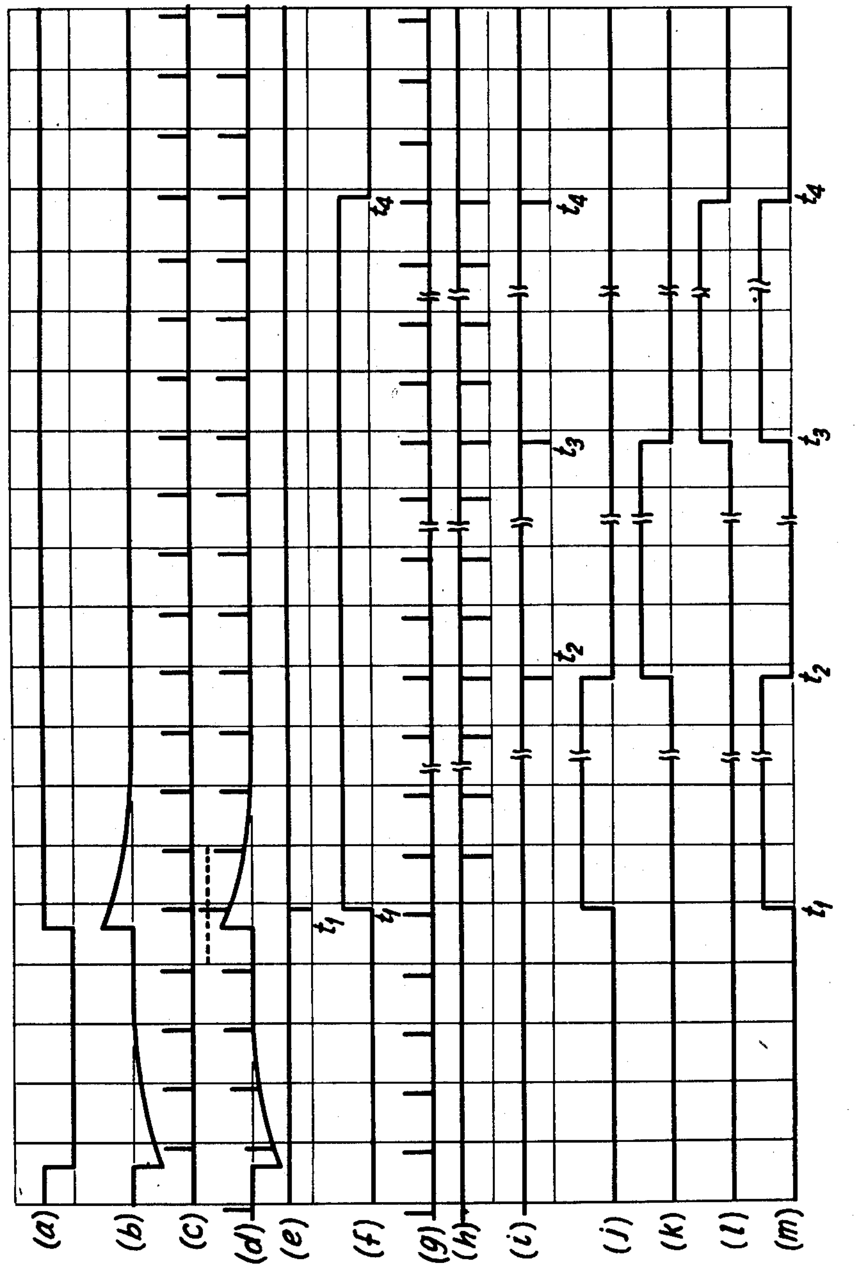
Fig. 3 is a further set of explanatory curves.

Referring to Fig. 3 there is shown a further set of explanatory curves and these represent some of the developed wave formations occurring during generation of the various signals by the timer and the synchronizing generator as will be explained hereinafter in this specification. The relative phases of these curves are shown and in some cases the curves have been broken away for purposes of clarity and from space considerations. This sequence of curves will be referred to more fully hereinafter during the explanation of the operation of the apparatus.

Figure 4:
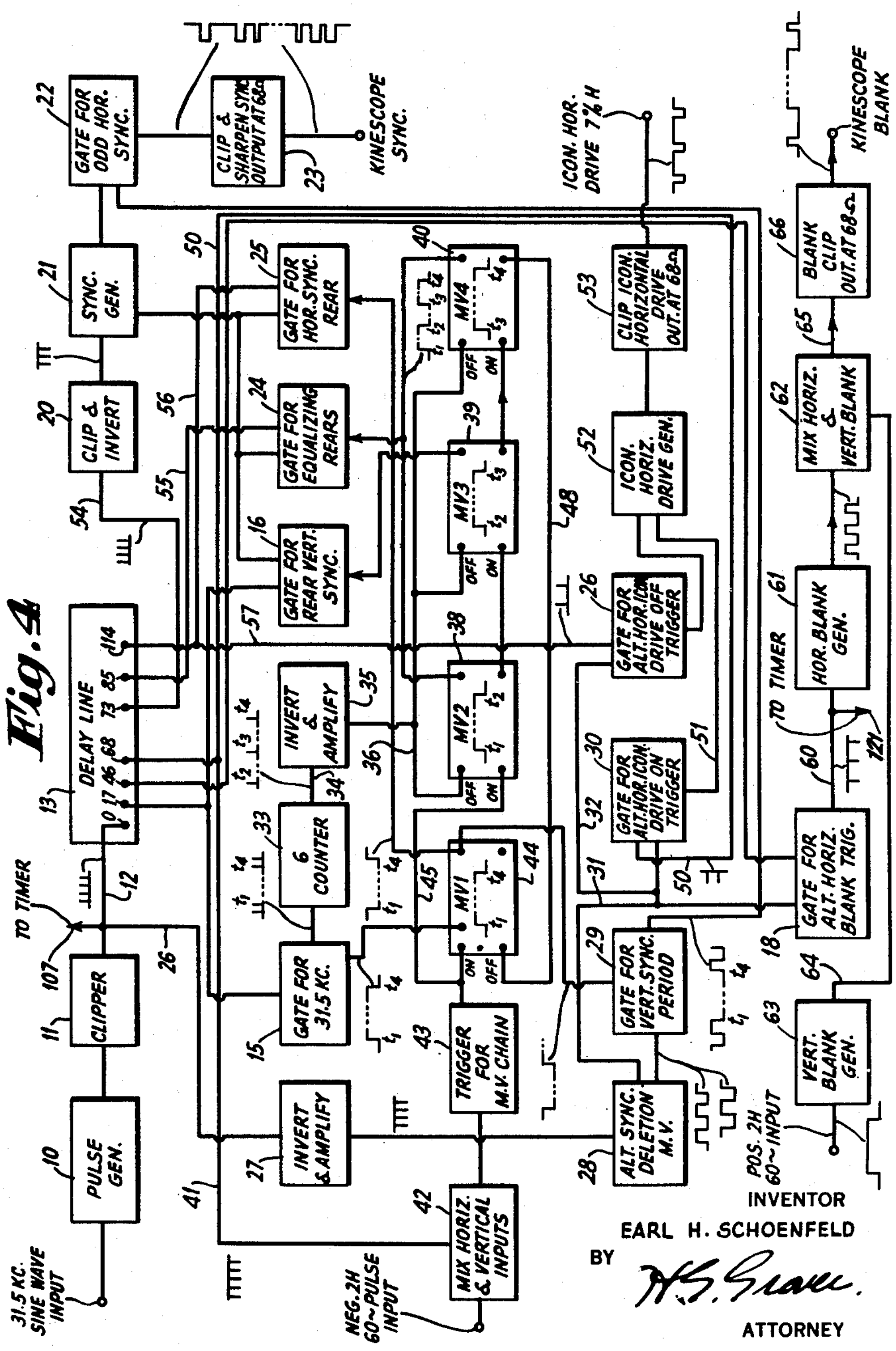
Fig. 4 is an explanatory block diagram of a synchronizing and blanking signal generator in accordance with my invention.

Referring to Fig. 4 there is shown a schematic block diagram illustrating the portion of my invention devoted to the generation of the synchronizing signals for use both at the transmitter and at the receiver and the blanking signals for use at the receiver in a television system.

A 31,500 cycle generator (not shown) has a portion of the output thereof impressed onto a pulse generator 10 and the output of the pulse generator is passed through a clipper circuit 11 to develop a series of sharp pulses or, as they may be termed, pips having a frequency of 31,500 cycles. A portion of the output of the clipper is fed along conductor 12 to a tapped delay line 13.

The delay line in practicing the invention has been constructed as follows:

The delay line consists of ten panels mounted vertically on a horizontal shelf. Each panel has sixteen 0.08 microsecond time-delay sections, thereby providing an overall maximum delay of 12.8 microseconds. The delay line sections were each made up of two coils wound on separate iron cores, which are separated by 0.025 inch in order to provide the desired amount of coupling. The iron cores were made so that they could be mounted by sliding them on a thin Bakelite rod. Spacers one half inch long were placed between adjacent sections to prevent any appreciable magnetic coupling across the entire section. One such row of coils was placed along the top and another along the bottom of each panel and the condensers were mounted between. The two coils of a section were connected so that they were series aiding with a 100 micromicrofarad condenser connected from their junction to ground. The inductance of each coil on its iron core was 26 microhenrys and a tolerance of plus or minus 5% in value for both the coils and condensers gave very satisfactory results. The sections on all ten panels were connected in series and terminated with 800Ω. (A variable resistance of 0–1000Ω was used and adjusted for zero reflection). Taps were taken at points along the line to provide the desired time delays. In this figure the line has been given reference numerals representative of the number of sections of line from the beginning or input to the particular tap which is numbered.

Signals from the tap 17 are fed to a gate circuit 15 which will be illustrated and explained more fully hereinafter in this specification, and the signals from this tap also are fed to a gate circuit 16. The purpose and operation of the latter gate also will be explained more fully hereinafter.

Signals from the tap 46 on the delay line are impressed onto a gate circuit 18 which is a gate to delete alternate horizontal blanking signal triggering signals and which will be explained more fully hereinafter.

Signals from tap 73 on the delay line are impressed, by means of lead 54, onto a clipping and phase inverting circuit 20 and the output of the latter circuit is impressed onto the synchronizing generator 21, the output of the latter being impressed upon a gate circuit 22 and thence to a clipping circuit 23.

Signals from the tap 85 are impressed onto a gate circuit 24 and signals from tap 114 are impressed onto a gate circuit 25 and a gate circuit 26, both of which will be explained more fully hereinafter in referring to the operation of the apparatus.

Another portion of the output from clipper circuit 11 is fed by way of conductor 26 to inverting and amplifying circuit 27 and thence to a deleting multivibrator 28, the latter having one portion of its output impressed onto a gate circuit 29 and another portion thereof impressed onto gate 18, gate 30 and gate 26 via conductors 31 and 32 respectively.

Associated with the gate circuit 15 is a counter circuit 33, the latter being connected through conductor 34, to an inverting and amplifying circuit 35, which in turn is connected through conductor 36 to the "off" terminal of 3 multivibrator units MV2, MV3, and MV4 which may be further identified as the elements 38, 39, and 40 respectively.

The tap 68 on the delay line is connected through conductor 41 to a mixing circuit 42 which has impressed onto the input thereof a 60 cycle pulse which is rectangular in form and has a negative portion substantially equal to twice the line or horizontal scanning interval and therefore is identified as a "2H" pulse. The output of the mixing circuit 42 is impressed onto a trigger circuit 43 which is connected to the "on" terminal of a multivibrator MV1 which may be further identified as the unit 44. The "off" terminal of MV1 also is connected to the "on" terminal of MV2 through conductor 45. An output or "off" terminal of MV2 is joined to the "on" terminal of MV3, and an output or "off" terminal of MV3 is connected to the "on" terminal of MV4. The "off" terminal of MV4 is connected through conductor 48 to the "off" terminal of MV1.

In referring to the "on" and "off" terminals of these multivibrators, the following should be kept in mind. The multivibrators are of the multistroke or non-self-restoring type. The output thereof is a rectangular wave form and if the output is taken from one tube, the output of the other tube will be in reversed phase with respect to the first tube. The multivibrators are arranged so that they will be self-restoring after an interval of time relatively long compared to the operating cycle of that portion of the invention of which they comprise a portion, hence they will be in the same receptive state each time the cycle is started. This means then that a signal which "flips" or changes the original operating state of the multivibrator may be said to have turned it "on" and the signal which "flops" or restores the multivibrator to its original operating state may be said to have turned it "off." Output pulses may be taken from desired parts of the multivibrator in accordance with the wave shape desired at a particular time.

The tap 68 on the delay line also is connected through conducting means 50 to the input of the gate circuit 30, the latter being a gate for deleting alternate horizontal drive signals at the transmitter. The gate circuit 30 then is connected through conductor 51 to the generator for generating the horizontal driving signals at the transmitter, and, since it is assumed for purposes of illustration, that an iconoscope type of tube may be used at the transmitter, the drawing of the generator 52 is identified as an "Iconoscope Horizontal Drive Generator." The horizontal drive generator 52 then is connected to a clipping circuit 53, the output of which goes to the driving means for the iconoscope (indicated but not shown).

For purposes of convenience there has been illustrated herein the legend indicating that an "iconoscope" type of tube is used as the transmitting tube and a "kinescope" type of tube used as a reproducing tube. This is for purposes of convenience only and it will be appreciated that these legends merely identify one type each of usable tubes. The image dissector tube or monoscope, etc., might be used as well as reproducing tubes known by other particular trade marked names.

The tap 114 is connected through conductor 56 to the gate circuit 25 which is a gate by establishing the rears of the developed horizontal synchronizing signal. The tap 114 also is connected through conductor 57 to the gate circuit 26 which is a gate for deleting alternate horizontal drive triggering signals for the iconoscope.

There is provided, in addition, a generator for developing horizontal blanking signals which are transmitted with the horizontal synchronizing signals and the gate circuit 18 feeds a portion of the triggering pulses fed thereto by way of conductor 60 to the horizontal blanking signal generator 61, the output of which goes to a mixing circuit 62 where the horizontal blanking signals are mixed with the vertical blanking signals, the latter having been generated in the vertical blanking generator 63 and conducted to the mixing circuit 62 by means of conductor 64. The mixed blanking signals then are fed through conductor 65 to a clipping circuit 66 and the clipped signals then are delivered from the element 66 as a composite blanking signal.

Figure 5:
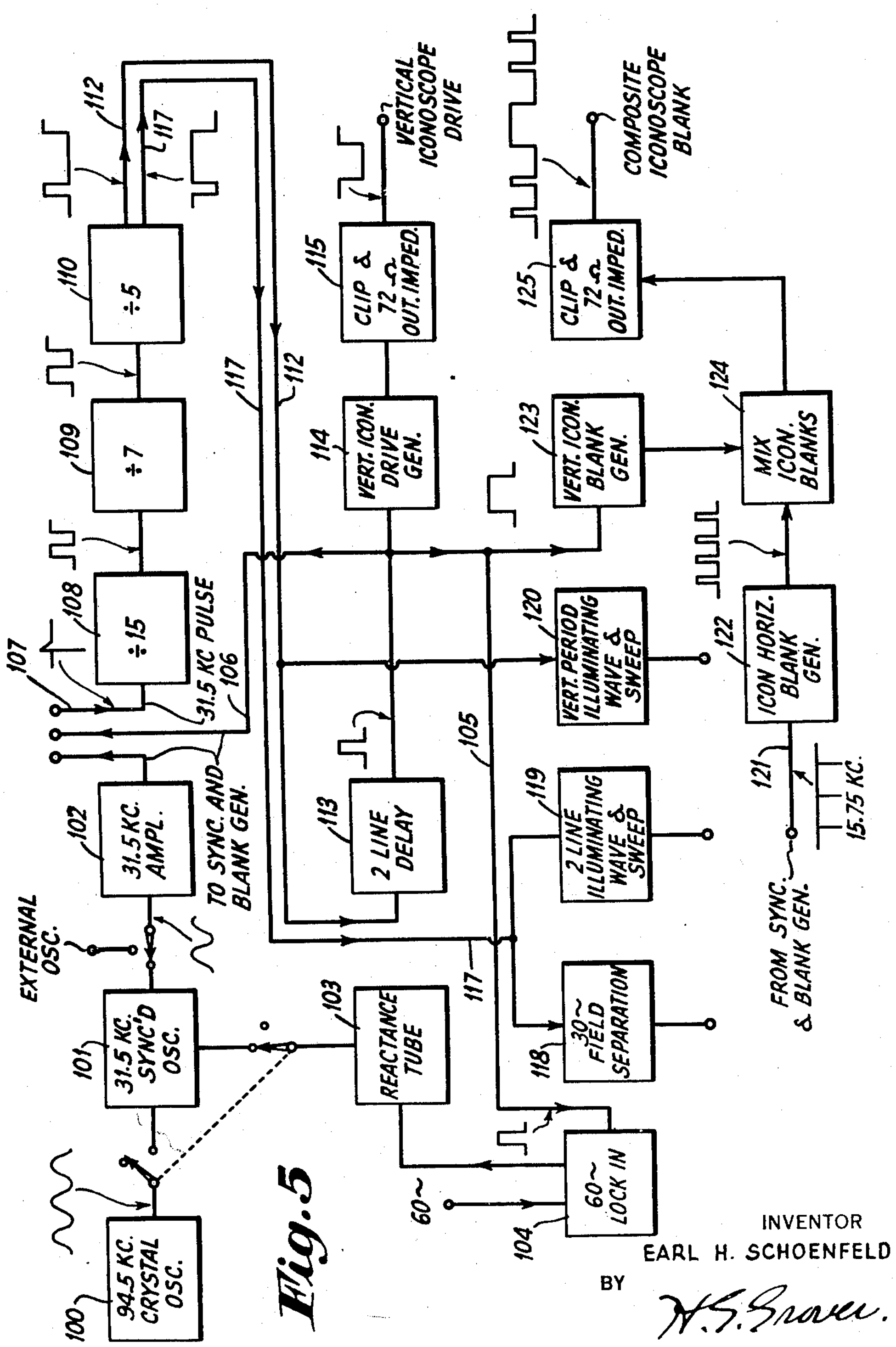
Fig. 5 is an explanatory block diagram of a television timer unit in accordance with my invention.

Referring to Figure 5 there is shown an explanatory block diagram of a television timer unit which has been used in practicing my invention. A 94.5 kilocycle oscillating crystal 100 is connected in cooperative relationship with a 31.5 kilocycle tuned oscillator 101, the combination forming a stabilized sine wave generator. Provision is made whereby an oscillator external to the apparatus may be inserted into the circuit if desired. The output of the 31.5 k. c. synchronized oscillator then is fed through a 31.5 k. c. amplifier 102 and thence to the synchronizing and blanking generator unit of Figure 4 as indicated.

The 31.5 k. c. synchronized oscillator may then be locked in with the 60 cycle supply by means of a phase discriminating circuit which utilizes a reactance tube, for correcting for phase changes. A phase discriminator detects the phase difference between the power line frequency and the timer output frequency and where an undesired phase difference occurs, the detector produces a direct current which, when applied to the grid of the reactance tube, causes a correction in the 31.5 k. c. oscillator such as to bring the 31.5 k. c. oscillator and the 60 cycle supply power into definite, desired phase relationship.

The 31.5 kilocycle pulses from the synchronizing and blanking signal generator may be fed to the timer as indicated by the lead 107 in Figure 4 and these pulses pass through three frequency dividing circuits 108, 109 and 110, the combination of these dividers producing from the 31.5 k. c. pulses a square wave such as indicated and having a frequency of 60 cycles. These frequency dividers are of the type set forth in an application by Grosdoff filed March 1, 1945, Serial No. 580,446. A part of this 60 cycle output is fed via conductor 112 through a delay circuit 113 and thence to the generator 114 for generating the signal of the vertical iconoscope drive at the transmitter, the output of this generator being fed through a clipping circuit 115 to a utilizing circuit, (indicated but not shown).

Another portion of the 60 cycle wave developed by the dividers is fed via lead 117 to a 30 cycle field separation circuit 118 and a circuit 119, the latter comprising a two line illuminating wave and sweep circuit.

From the synchronizing and blanking signal generator there may be drawn pulses having a half of the 31.5 kilocycle steep pulse frequency or a 15.75 k. c. frequency signal, and these are passed through conductor 121 to the generator for generating the horizontal blanking pulses for the iconoscope tube at the transmitter and this circuit is identified as 122.

The conductor 106 leading to the synchronizing signal generator also is connected to a generator 123 which develops the vertical iconoscope blanking signals and the units 122 and 123 are both connected to circuit 124 which is a mixing circuit for mixing the iconoscope horizontal blanking signals and the iconoscope vertical blanking signals and the composite iconoscope blanking signals so formed are passed through a clipper 125 and thence to a utilization circuit (indicated but not shown).

The action of the apparatus is as follows:

It has been indicated hereinbefore in this specification that one of the main objects of the invention is to provide an arrangement for generating or forming various signals used in television apparatus and which will maintain a constant phase relationship each with the other. Accordingly, the signals generated by this device evolve around the generation of a constant phase, very steep edged set of pulses or pips, which determine the generation of all of the signals developed by the apparatus. Accordingly, the sine wave generated by the synchronized oscillator unit 101 of Figure 5 is fed into pulse generator 10. This generator will be illustrated more fully hereinafter in Figure 6 of this specification.

The pulse generator 10 comprises a blocking oscillator which is synchronized in its operation with the sine wave and, in addition, the very sharp pulses formed by the blocking oscillator effectively are combined with the sine wave and this combination is passed through clipper circuit 11. The result is that from the clipper circuit there is put out a 31.5 kilocycle signal which is a very sharp steep edged pulse or as it may be termed a pip. This pulse as it is used in the development of various signals is represented in Figure 2 as curve *b* thereof. It is also indicated in the Figure 4 along side the conductor 12 prior to its impression onto the delay line 13.

The signal will be delayed for differing periods of time in its traversal of the delay line and the signal is utilized to control the leading edge of all of the generated signals in this apparatus. Since the 31.5 kilocycle pulse itself is a constant phase signal, it will be apparent that the leading edge of each of the generated signals must maintain a constant phase relationship.

In the development of the transmitted synchronizing signal the horizontal synchronizing signals, the equalizing signals and the vertical synchronizing signals have the generation of both the leading and trailing edges thereof controlled by this single 31.5 k. c. generated signal and all are developed by means of a single generator, thus assuring accuracy of phase and doing away with manual control of the signal generator. By way of illustration, let it be assumed first that what is desired to be generated is the six equalizing signals followed by the six vertical synchronizing signals which in turn is followed by six more equalizing signals.

*Equalizing signals*

It can be assumed that the first six equalizing signals may be generated in an interval between a time $t_1$ and a time $t_2$; that the vertical synchronizing signals are generated during an interval between a time $t_2$ and a time $t_3$ and the remaining six equalizing signals may be generated in an interval between the time $t_3$ and a time $t_4$. For practical purposes it may be assumed that time $t_1$ to $t_2$, time $t_2$ to $t_3$ and time $t_3$ to $t_4$ are equal intervals. In the practical embodiment of this invention, however, the time $t_1$ to $t_2$ is slightly less than the other two intervals and the reason for this will be explained more fully hereinafter. Hereinafter these intervals will be referred to as time $t_1t_2$; $t_2t_3$; and $t_3t_4$.

Referring now to the curves of Figure 2, the curve *b* represents the pulse which initiates the various signals or establishes the leading edge thereof, and this is taken from tap 73 on the delay line. The curve *c* represents the relative phase of the same signal as it appears at tap 85 and the signals from tap 85 will establish the rears of trailing edges of the equalizing signals.

There has been shown impressed onto the element 42 a signal taken from the timer and which has a frequency of 60 cycles and has a negative portion thereof which is substantially the duration of two scanning lines in length and this portion of the signal is referred to as 2H. This signal is shown as curve *a* in Figure 3. Since it is developed from the 31.5 k. c. steep edged signal generated, its phase is fixed. Now if this signal be passed through a differentiating circuit (well known) the resulting signal will be of the form shown in curve *b* of Figure 3. The phase of this signal (and that of the negative 2H pulses) may be selected with respect to the phase of the 31.5 k. c. steep edged pulses from the delay line. The relative phase of the two pulses is indicated by curves *b* and *c* of Fig. 3. Now if the signals of curves *b* and *c* be added the result is a curve shaped in the manner indicated by curve *d* of Fig. 3. Now if these signals be combined and the combined signal be passed through a clipping circuit (well known) as indicated by the dashed line on curve *d*, the output of the clipping circuit will be a series of very steep edged pulses or pips occurring sixty times per second. It is the occurrence of this 60 cycle pulse which establishes the time $t_1$ hereinbefore referred to in this specification and this is indicated in curve *e* of Fig. 3. It will be appreciated that the polarity of this pulse may be selected. It is impressed as a negative pulse onto the input of multivibrator MV1 and MV2 to "turn on" or flip or to place in a definite operating state these two multivibrators.

Assume now that at the time $t_1$, multivibrators MV1 and MV2 are turned on, that is to say are brought to a desired portion of their operating cycle. These two multivibrators are of the so-called flip-flop or triggered type and will remain on until triggered or turned off, or otherwise returned to their original state. A reference to Fig. 4 will show that the circuit 24 will be gated under the influence of MV2 and also MV4. Accordingly while MV2 is on or in one portion of its operating cycle, the gate 24 will be operative, a positive signal being impressed thereon. It also will be noted that the "off" terminal of MV2 is controlled by circuit 33 through circuit 35, the former being identified as a 6 counter. The 6 counter is a circuit of the type referred to in the application of Igor Eugene Grosdoff, Serial No. 580,446, filed March 1, 1945, and entitled "Electron Counter" and is a type of counter circuit whose action is controlled by a specific number of pulses being impressed thereon. The action of this part of the circuit is as follows:

The 31.5 k. c. steep pulses are impressed onto gate 15, the latter being controlled by MV1 and being operative as long as MV1 is "on," or from time $t_1$ to $t_4$. Accordingly at time $t_1$, gate 15 will begin to operate. At the end of six pulses impressed onto the 6 counter the latter will deliver a pulse to MV2, MV3 and MV4. If any of these multivibrators is "on" then it will be turned off, or restored to an original state. Accordingly at the end of the first 6 pulses impressed on the 6 counter, MV2 will be turned off. A 6 counter was selected because with the type of signal radiated there are six equalizing signals developed in two series of equalizing signals, and six vertical synchronizing signals. MV2 controls the generation of the first series of equalizing signals. When MV2 is turned off the time $t_2$ has been identified. The control of MV2 has been indicated by curve *j* of Fig. 3.

Now, during the period $t_1$, $t_2$ the generator 21 being a flip-flop or multi-stroke type of multivibrator will be flipped by the 31.5 k. c. pulse from tap 73 and flopped by the pulse from tap 85 on delay line 13, since gate 24 is operable during the interval. This will occur six times since MV2 will be turned off by the 6 counter after six pulses have been impressed thereon. Thus the first series of six equalizing pulses is developed.

*Vertical synchronizing pulses*

At the time $t_2$ the multivibrator MV3 will be turned on (the "on" control of this multivibrator being controlled by the change in voltage across a part of MV2 when MV2 is flopped or returned to its original state due to the action of the 6 counter thereon). Now the 6 counter will allow MV3 to remain operable until six more pulses of 31.5 k. c. frequency have been impressed on the counter and the time at which the 6 counter developes a second pulse determines the time $t_3$. The phase of the pulse determining the rear edge of the vertical synchronizing pulses is shown as curve *a* of Fig. 2. Since MV3 will remain operable during the interval $t_2t_3$, gate 16 will remain operable during the same interval and the pulses from the tap 17 will pass through gate 16 to generator 21 to establish the rear edges of the vertical synchronizing signal. During interval $t_2t_3$ six of these pulses will be developed. Thus the six vertical synchronizing pulses follow directly behind the first set of six equalizing pulses.

*Second equalizing signals*

At the time $t_3$ the multivibrator MV4 will be turned "on" (the drop in the voltage across one part of MV3 acting to operate this multivibrator which is also of the flip-flop type). Again the 6 counter will allow MV4 to operate until six pulses have been impressed onto the counter. The action of MV4 being similar to MV2, extended explanation is not considered necessary. MV4 will be turned off by the 6 counter at a time $t_4$. During the interval $t_3t_4$, gate 24 will be operable and six more equalizing pulses will be developed. However a part of the voltage drop occurring when MV4 goes off is utilized to turn off MV1, all of these multivibrators being of a type so that their oscillating characteristic is such that one pulse impressed thereon determines one portion of its cycle and they will remain in a changed state until a second pulse re-establishes their initial state. This is, in general, true except as has been pointed out hereinbefore, a restoring condenser may be used to restore the mutivibrator after the lapse of a definite time interval. It will be apparent that MV1 has been operable during the entire time $t_1t_4$. Further since gate 15 is controlled by MV1 and is operable only during such time as MV1 is operable, that is to say while MV1 is in the "flipped" state, the gate 15 will be unable to impress pulses onto the 6 counter at any time other than during the interval $t_1t_4$.

The output pulses of the 6 counter are shown in curve $i$ of Fig. 3 and in this same figure, the operating cycle of MV1 is shown by curve $f$ (and by operating cycle is meant a showing of the voltage across a part of the multivibrator). The operating cycle of MV2 is shown by curve $j$. The operating cycle of MV3 is shown by curve $k$. The operating cycle of MV4 is shown by curve $l$. The operating cycle of both MV2 and MV4 together (these multivibrators determining the generation of both sets of equalizing signals) is shown by curve $m$.

*Horizontal synchronizing signal*

Reference now may be made to the horizontal synchronizing signals which form a part of the signal radiated. Normally the signals are generated from the action of the 31.5 k. c. pulses or pips from tap 73 acting to establish the leading edge of the pulses and signals or pulses, or pips as they may be termed, from tap 114 of delay line 13 acting to establish the rears of the signals through gate 25. It will be apparent, however, that during interval $t_1t_4$ no horizontal synchronizing pulses should be developed. This may be accomplished by taking off from MV1 a voltage having a wave shape as indicated in curve $g$ of Fig. 2 and using the voltage to keep gate 25 closed during the equalizing and vertical synchronizing signal generation period. The multivibrators are triggered on for a short period of time $t_1t_4$ once per field of scanning and the recurring signal developed within MV1 may be utilized to determine both the intervals during which the equalizing and vertical synchronizing signals are developed, and also develop a control for eliminating generation of horizontal synchronizing signals during this interval.

Gate circuit 25 normally is open, or conducting, and through this gate circuit the pips from tap 114 of the delay line pass to synchronizing generator 21 to establish the rears of the horizontal synchronizing signals. During time $t_1t_4$, however, a negative voltage may be taken from MV1 and used, when impressed on gate circuit 25, to render this gate inoperative, and, hence, prevent the generation of horizontal synchronizing signals during this interval of time. When MV1 is "off" the signals are generated in a normal fashion.

It has been stated that in the practical embodiment of this invention the phase of the rear edge of the signal from the differentiating network and which has been developed from the 2H long 60 cycle signal from the timer unit is slightly out with respect to one of the 31.5 k. c. pips (see curve $d$ of Fig. 3). The reason for this is that normally during a cycle of operation the 6 counter, having to deliver three pulses, must have eighteen pulse intervals in which to do this. If the phase of the 31.5 k. c. pip and the rear edge of the differentiated signal from element 42 were the same, the first pip might pass through gate 15 simultaneously with MV1 and MV2 going on at time $t_1$. It is to keep the 6 counter from being responsive to this initial pip that the phase of one of these two signals is selected so that the 6 counter does not start counting until approximately at the end of one interval between two of the 31.5 k. c. pips. To this extent therefore the interval $t_1t_2$ is not equal to interval $t_2t_3$ and $t_3t_4$, the latter two being equal.

*Horizontal synchronizing signal deletion*

Since the horizontal synchronizing signals have been developed from the pulses or pips having a 31.5 k. c. frequency and further since during the interval between the time $t_4$ and the time $t_1$ a horizontal synchronizing pulse is developed for each of the pips generated (this time being a complete cycle of operating time with the exception of the interval $t_1t_4$), it will be apparent that twice as many horizontal synchronizing signals are being developed as are usable. This is due to the fact that there are 262½ lines to the field of scanning and there are 60 fields scanned per second. A frequency of 31.5 k. c. bears an even relationship with respect to the 60 cycle field frequency. It is necessary, therefore, to delete alternate horizontal pulses.

For this purpose there is developed from the 31.5 k. c. pips a wave which may be used as a deleting wave. For this purpose a multivibrator 28 is provided which has fed thereto (by means of conductor 26) the 31.5 k. c. pip from the zero tap on the delay line 13. This is a flip flop type of multivibrator and the output wave form thereof is shown in curves $k$ and $l$ of Fig. 2. These curves represent the voltage variations developed by the multivibrator during alternate scanned fields. These may be combined with the operating signal of gate 29 and the result is curves $m$ and $n$ of Fig. 2. These signals are effective during alternate fields to control horizontal synchronizing signal output. These signals are passed through a gate circuit 29 and since the gate 29 is operative when MV1 is off, and this is during the time $t_4t_1$, the signals from the multivibrator 28 may be impressed onto the gate circuit 22 during time $t_4t_1$, the latter being a gate for deleting the alternate horizontal synchronizing signals and having fed thereto the signals from synchronizing signal generator 21. This gate may be considered a form of mixing circuit in which the circuit is non-conducting if either of the waves impressed thereon for mixture is sufficiently negative in value. Referring to curve $j$, Fig. 2, there is shown, partially broken away, the horizontal synchronizing signals developed (only four being shown for space reasons), the vertical synchronizing signals (again only four being shown) and the both sets of equalizing signals (again only four being shown of each). This wave form will be impressed onto one grid of the multigrid tube of the mixing circuit 22. A curve such as shown in curve $m$ of Fig. 2 (and which is the effective output curve of gate 29) will be impressed onto the other grid of the tube. The result will then be that alternate horizontal synchronizing signals will be deleted during the negative half cycles of the output wave form of circuit 28. Curve $m$ represents the wave form impressed onto one grid of the gate 22 during the scanning of one field of the image but since this circuit relates particularly to odd line interlacing, the curve $n$ of Fig. 2 will be impressed onto one of the grids of the multi-grid mixing tube of circuit 22 during the scanning of alternate fields. Apparent displacement between these two curves is brought about by the relationship between the number of lines scanned, namely 525 to the complete picture, and the number of fields scanned per second which is 60. The type of mixing circuit that is used will be shown hereinafter in Figure 11.

Accordingly, for alternate fields of scanning there will appear in the output circuit of the mixing circuit or gating circuit 22 a wave form such as shown in curves o and p of Fig. 2. This is fed into a clipping and sharpening circuit 23 and this composite signal represents the means for kinescope synchronization.

The synchronizing signals, therefore, all have been generated by the single synchronizing signal generator 21 and since the phase of the 31.5 k. c. pips is constant, the relative phase of all of the developed signals illustrated must be fixed and constant.

*Receiver blanking signals*

In the generation of the blanking signals associated with this apparatus, those for the kinescope or receiving apparatus will be considered first. Pulses from the tap 46 on the delay line 13 are conducted to a gate circuit 18. Also conducted to the gate circuit is the signal from the multivibrator 28 which also acts to delete alternate horizontal synchronizing pulses. Since the gate 18 will be conducting only when the wave from the multivibrator 28 is positive in polarity (this being a type of mixing circuit), it will be apparent that only half of the pulses from the tap 46 will pass through the gate. These pips then will be of a frequency of 15.75 k. c. and will be constant in phase. These pips then are fed to a well known form of multivibrator circuit which may start its cycle when one of the pulses is impressed thereon and which is of a self-restoring type of multivibrator as contradistinct from the flip-flop or non-self-restoring types of multivibrators which have been referred to up to this point of the specification. The normal time period of the multivibrator is about twice as much in present practice than that of the horizontal synchronizing signals. These signals therefore are fixed in phase with respect to the synchronizing signals and since 28 is not operating during time $t_1t_4$, the gate 18 is held closed during this period.

The vertical blanking generator for developing the vertical blanking signal for the kinescope is actuated by a differentiated wave from the 60 cycle output section in the timer. The 60 cycle rectangular wave derived from the timer has a positive component which is approximately the length of two scanning lines in time or 2H. The positive portion of the cycle is differentiated and one of the pips so formed is used to key a multivibrator of the self-restoring type and an output wave which is 4½ to 9% of the length of a field scanning time is developed, occurring at a rate of sixty cycles per second. The multivibrator is made adjustable so that the width of the blanking signal may be varied.

Figure 11A:
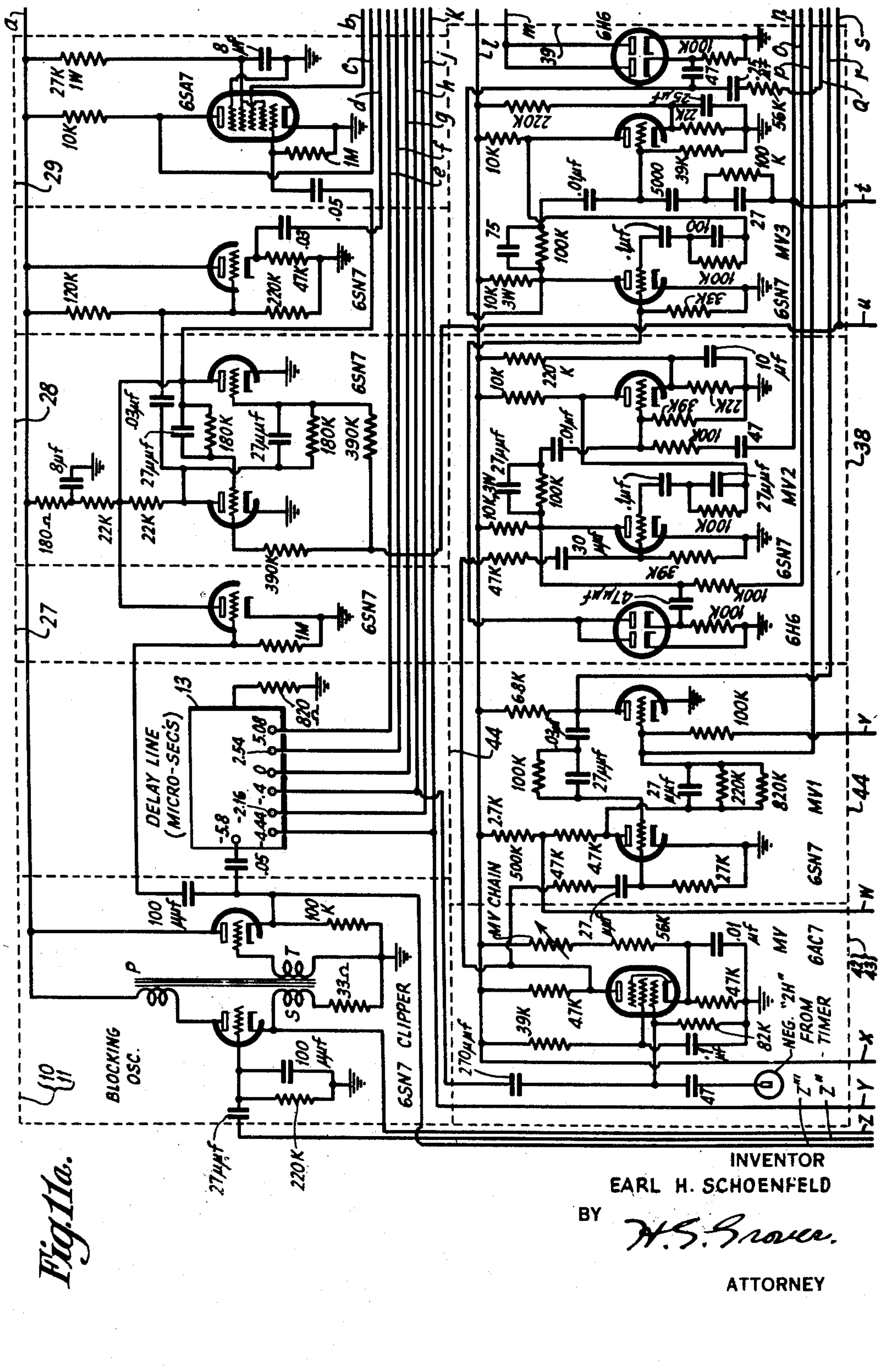
Figure 11B:
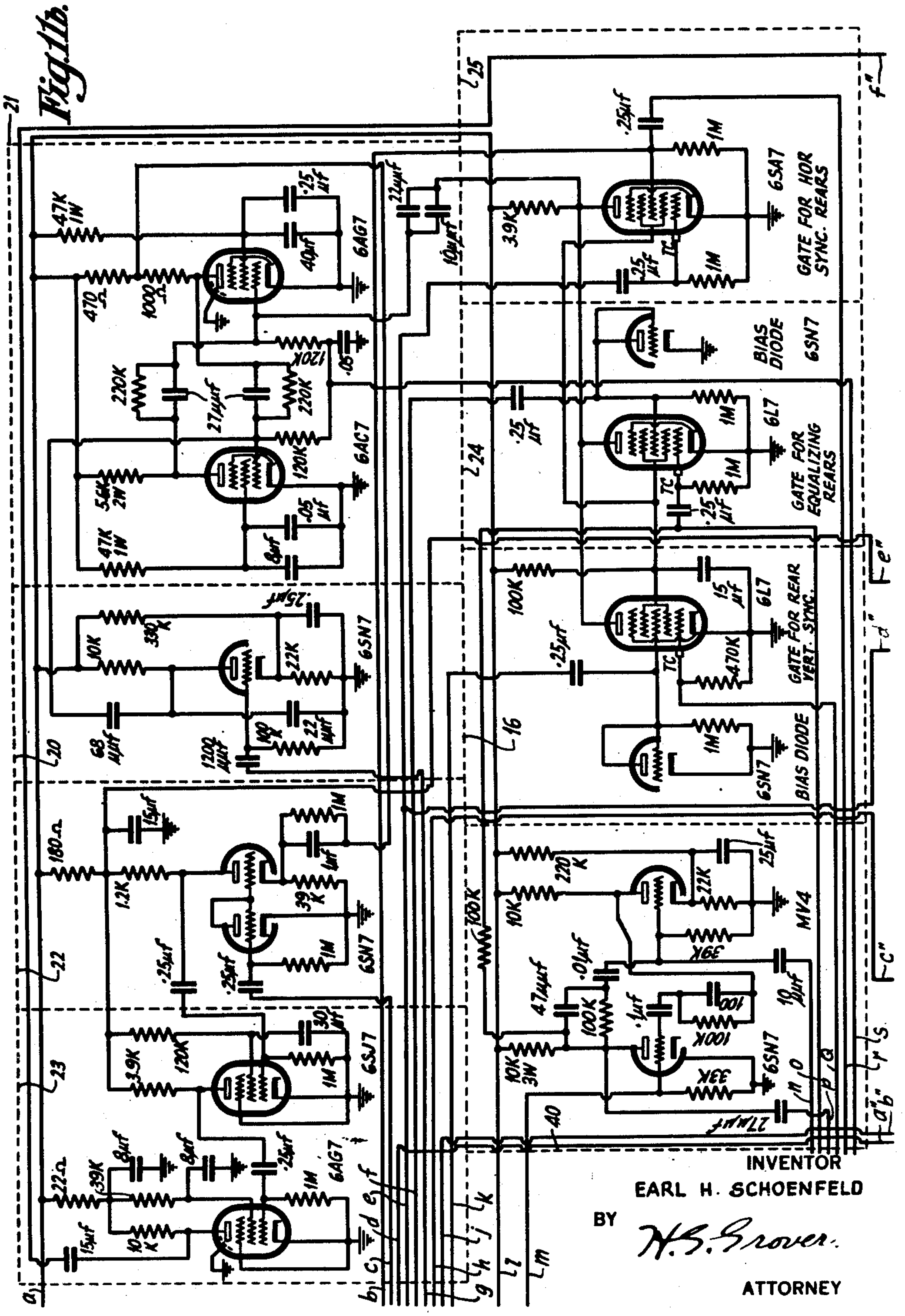
Figure 11C:
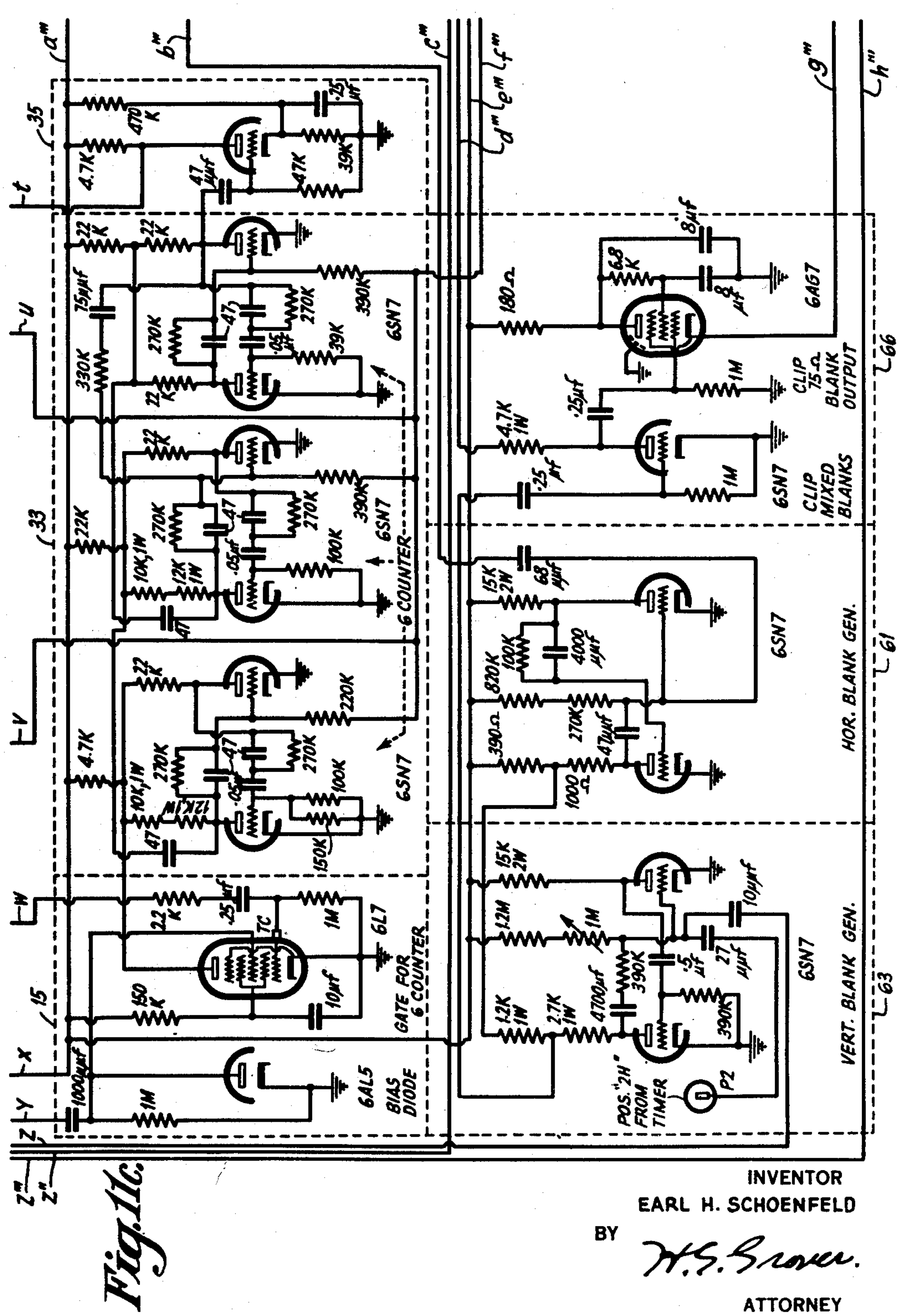
Figure 11D:
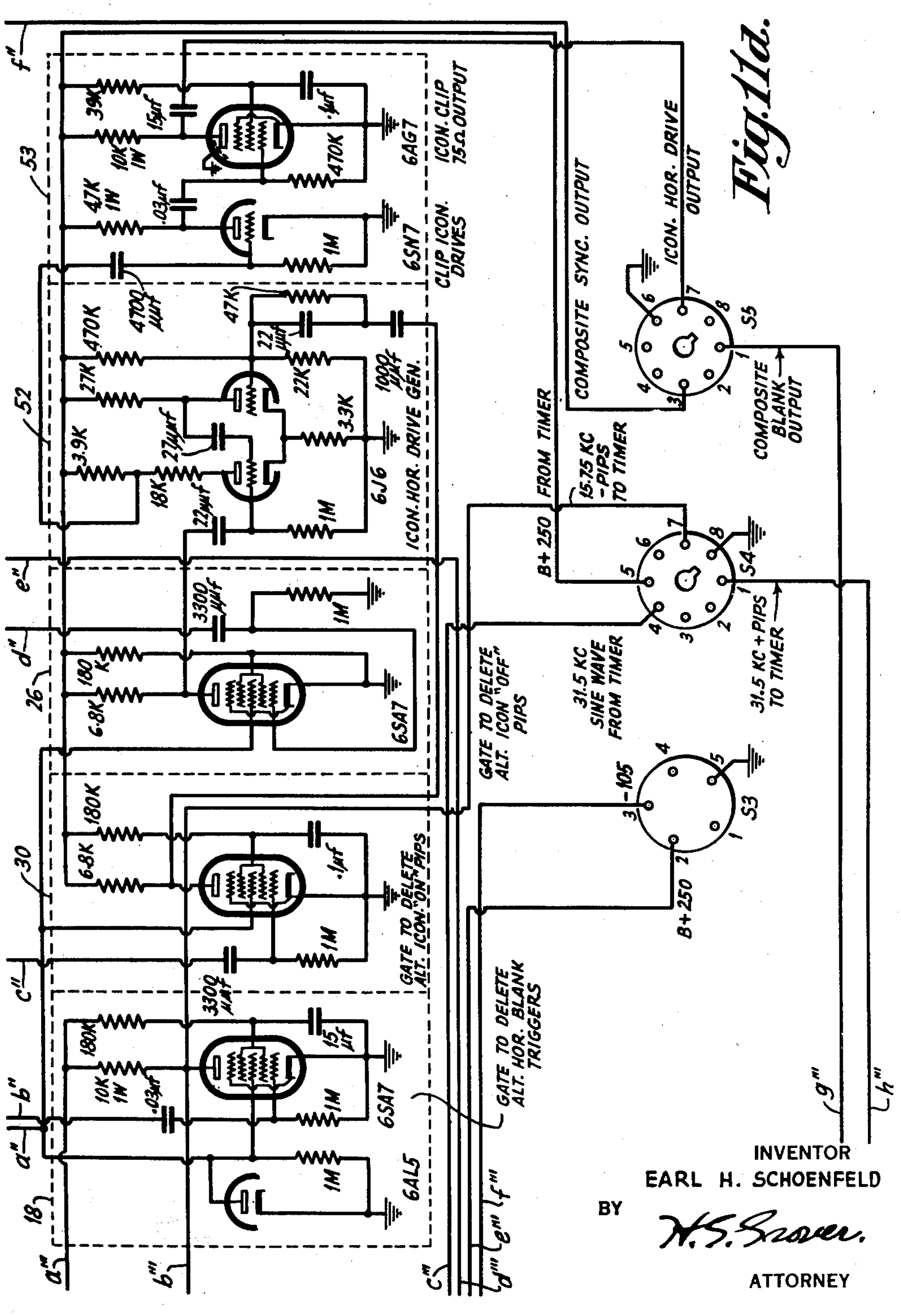

Signals from the horizontal blanking generator 61 and the vertical blanking generator 63 are mixed as shown hereinafter in Figure 11c. The output of circuit 62 is fed to a clipping circuit 66 by means of conductor 65 and the output of the clipping circuit 66 gives the complete kinescope blanking signal.

The length 2H which is twice the scanning time of a normally scanned line and which has been referred to as the length of the positive portion of the rectangular wave obtained from the timer in the development of the blanking signals, was selected in order that a laboratory type of oscilloscope can easily be used for monitoring purposes with this apparatus.

*Transmitter driving signals*

The multivibrator which generates the wave form for deletion of alternate horizontal synchronizing signals also is used to delete alternate signals which furnish the horizontal drive for the cathode ray scanning tube, or, in this case, an iconoscope or "monoscope." This generator has been referred to hereinbefore as a so-called flip-flop multivibrator and will be shown more fully hereinafter in Fig. 11.

Pips of 31.5 k. c. frequency are delivered from tap 68 on delay line 13 and are impressed onto gate circuit 30. The output of the gate 30 is impressed onto the iconoscope horizontal drive generator 52 to establish one of the edges of the output signal thereof. The generator 52 is a flip-flop type of multivibrator producing a rectangular wave. The front of the wave may be determined by the signal which flips the generator and the trailing edge of the wave may be determined by the pulse which restores or flops the generator back to its initial state. The gate 30 is operated by the output wave from multivibrator 28, and which is the generator for deleting alternate horizontal synchronizing signals. The result will be that alternate pips impressed on gate 30 will be effectively deleted. The relative wave form produced by multivibrator 28 for each field of scanning is indicated at lead 31.

Gate 26 also is provided, which is controlled by both the signals from the multivibrator 28 and the 31.5 k. c. pips from tap 114. The result is that both the leading edge pips and the pips for establishing the trailing edge of the driving signal for the iconoscope will, in alternate instances, be deleted since gate 26 also is operable under the influence of multivibrator 28. The generator 52 will operate under the control of both gate circuit 30 and gate circuit 26 each of which will conduct pips of a frequency of 15.75 k. c. The output of circuit 52 then is impressed onto a clipping circuit 53 (well known) and the output thereof is fed to a utilization circuit (indicated but now shown).

If the horizontal driving signals are to be fed over cables long enough to cause appreciable delays, as may be the case in supplying a distant pick-up tube, it is possible to change the settings of the leading and trailing edges thereof by moving the taps on the delay line from which the triggers are secured. The output has been of a negative polarity and has measured about 5 volts peak to peak across 72 ohms. Its length has been about 7% of the scansion time of a single line.

In the case of the vertical iconoscope drives, a single stroke, or self-restoring form of multivibrator may be used. This multivibrator may be triggered by the differentiated result of a rectangular wave having one component thereof of a length equal to approximately twice the length of the scanning time of a single line and which has been referred to hereinbefore with reference to the generation of the vertical synchronizing signals. The sixty cycle wave so differentiated is obtained from the timer unit. The output of the multivibrator 114 of Fig. 5 will be a rectangular wave having the length of its positive and negative components governed by the time constants of the RC circuits of the multivibrator which generates it, and which will be shown hereinafter in Figure 11. Accordingly, its width may be governed by making at least one of the time constant circuits involved adjustable in value. The output of the multivibrator generator may be clipped and amplified so that in actual practice a signal of negative polarity is supplied having a peak to peak value of about 5 volts.

*Transmitter blanking signals*

No standards have, as yet, been set for blanking signals for iconoscopes or monoscope transmitter equipment. The important considerations, however, are that both the horizontal and vertical blanking should start at the same time, or prior to, the start of the respective drives. If the drives begin co-incidently with the kinescope blanking, as has been recommended, this would require the iconoscope blanking signals to start at the same time. The duration of each blanking signal should be equal to, or greater than, each respective drive and also equal to or less than, each respective kinescope blanking signal.

Impulses or pips from tap 46 of delay line 13 and having a frequency of 31.5 k. c. are impressed onto gate circuit 18. This gate circuit also has impressed thereon the signals developed by the multivibrator 28 and which have been referred to hereinbefore in this specification. Since the latter signals will delete alternate pips which are impressed onto the gate 18, a succession of pips of 15.75 k. c. will pass through the gate and, as indicated in Fig. 5, will be directed by way of lead 121 to the iconoscope horizontal blanking signal generator 122. This blanking signal generator is a single stroke, or self-restoring type of multivibrator and will be shown hereinafter in Figure 10*b*. The pips will establish the leading edge of the output signal from the multivibrator and the duration of the signal generated will be governed by the parameters of the oscillator itself.

The trigger used to develop the vertical blanking pulse for the iconoscope or monoscope is a differentiated pulse obtained from differentiating the positive portion of a rectangular 60 cycle pulse which is obtained from the timer and which has been referred to hereinbefore in this specification. The positive portion of the pulse itself has a duration which is substantially equal to about twice the scansion time for a single line of the image undergoing scansion or 2H. The peak of this differentiated pulse is utilized to trigger a single stroke or self-restoring type of multivibrator and, similarly to the case of the generator for developing the horizontal blanking signals, the length of the signal so generated is dependent upon the parameters of the multivibrator. The parameters of the multivibrator may be made adjustable if so desired, and, therefore, the length of this blanking pulse may be altered. However, whether adjustable or not, its leading edge always will occur at a fixed time since it is triggered by the wave from the timer which in turn is obtained from the 31.5 k. c. pips.

The signals developed by the iconoscope vertical blanking generator 123 are combined with the iconoscope horizontal blanking signals in a well known form of mixing circuit 124 and the composite blanking signal so formed may be passed through a clipping circuit 125, the output of which furnishes the composite blanking signals for the transmitter scanning tube. The signal measures about 5 volts peak to peak across a resistance of 72 ohms.

While the blanking signals are rarely used with a monoscope, they are provided for use if so desired and are usable with camera pick-up tubes where such signals are demanded.

Figure 6:
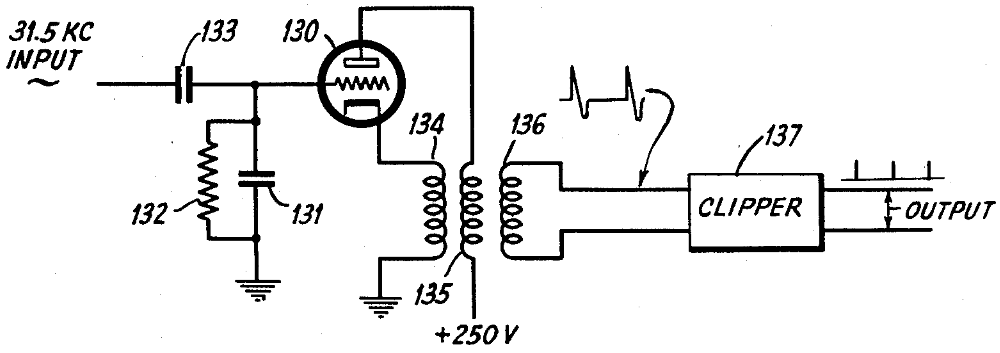
Fig. 6 is a schematic diagram of a circuit for producing high frequency pulses, or pips, having very steep wave fronts.

Referring to Fig. 6, there is shown an illustrative apparatus that might be used for generating the 31.5 k. c. steep edged pips. It would be appreciated that this may be done by more than one type of generator and that this is an illustrative embodiment. A thermionic tube 130 has connected to the input thereof a time constant circuit comprising condenser 131 and resistor 132. One side of the circuit is connected to ground and the other side is joined to the control grid of the tube. Also connected to the grid of the tube is an input condenser 133. A sine wave having a frequency of 31.5 k. c. and supplied by the timer unit, is impressed onto the input of the tube through this latter condenser. Connected in the cathode-ground circuit of the tube is an inductive element 134. This is coupled to an inductive element 135 connected in the anode-cathode circuit of the tube and also is coupled to an inductive element 136 which is connected to the input circuit of a clipper circuit 137. The result will be that there will be impressed onto the clipper circuit 137 a substantially sine wave shaped curve with an extremely sharp burst or pip impressed thereon. The clipper circuit is a so-called peak clipper that is well known to the art to which this case belongs and will be shown more fully hereinafter in Fig. 11*a*. It is set to conduct only at peaks of signals having a predetermined amplitude and the peak in this case will be the very steep edged pulse or pip superimposed on the substantially sine shaped wave. The result is that there will be put out a set of pulses having an extremely steep edge and having a frequency of 31.5 k. c.

In action, the tube 130 normally is conducting so that there appears in the winding 135 a gradually increasing wave. The winding 135 being coupled to the winding 134 in the cathode-ground circuit will feed back regeneratively and the tube will start drawing grid current at a predetermined level, thus affecting the potential on the grid itself. The regenerative effect will continue until some type of saturation is reached at which point, due to well known phenomena, a negative feed back will begin and the tube will eventually be driven to cut-off. Thus the cycle is established.

Figures 7, 9:
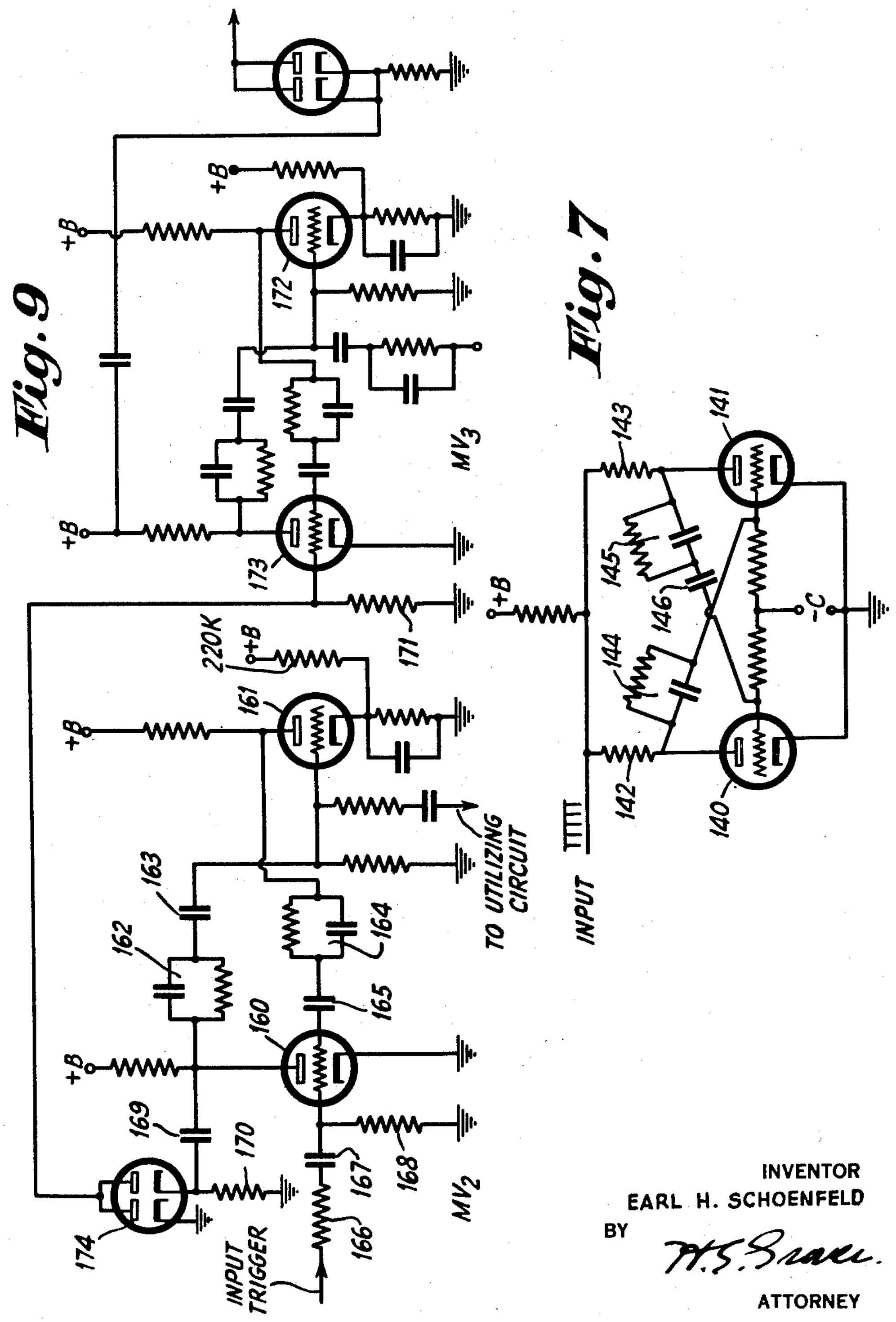
Fig. 7 is a form of an on-off multivibrator circuit.
Fig. 9 is a showing of a pair of co-acting multivibrators.

Referring to Fig. 7, there is shown a two stroke type of multivibrator or what is commonly called a flip-flop type of multivibrator. In this arrangement, there is provided two vacuum tubes 140 and 141, each having anode, cathode and control electrodes. The anodes of the two tubes are connected together through a resistance 142 in the anode circuit of tube 140 and a resistance 143 in the anoode circuit of tube 141. The anode of tube 140 is cross-connected to the grid of tube 141 through a time constant circuit 144 and the anode of tube 141 is cross-connected to the grid of tube 140 through a time constant circuit 145 and an additional condenser 146. The purpose of the additional condenser 146 is to act as a restoring condenser after the elapsing of a certain interval so that the multivibrator always finds itself receptive in a predetermined manner for signals impressed onto it in this apparatus. This is important because multivibrator MV1, MV2, MV3, and the like, which have been referred to hereinbefore should, for purposes of keeping the output wave in the correct phase, find themselves in the same initial state when they are triggered on. The restoring time is long compared to the normal operating cycle time of the multivibrator. In this case, let it be supposed that tube 140 is conducting and therefore dominates the multivibrator. This will mean then that the grid of tube 141 is driven below cut-off. Now, if a negative pulse such as those indicated at the input of the device be impressed onto the circuit as indicated, the potential of the grid of tube 140 may be driven down to a lower value. When this happens, the tube will draw less current and the potential of the grid of tube 141 will rise since the plate current drop across resistor 142 has been decreased. This will mean then, that the grid of tube 141 may rise above cut-off and current will start flowing through resistor 143. The grid potential of tube 140 will drop further due to current drop through resistor 143. This will continue until tube 140 is cut off. The circuit then has been flipped. Upon the receipt of a second negative pulse, the opposite effect takes place. In the latter case, the grid of tube 141 will be eventually driven below cut-off and the potential of the grid of tube 140 will rise. Tube 140 then will begin to conduct and will be the dominating tube again in the circuit. Since it takes two complete pulses to cause the apparatus to go through one cycle of its operation, it will be appreciated that the circuit also acts as a frequency divider. The purpose of condenser 146 is to act as a restoring condenser and if plate current flows in the plate circuit of tube 141 for a sufficiently long time, condenser 146 will gradually charge to a value whereby the potential of the grid of the tube 140 gradually rises to a value above cut-off and tube 140 will take over in the circuit again, the parameters of the circuit being so adjusted that this may take place in a predetermined time. The circuit is set so that the length of restoring time is, however, longer than the interval between driving pips normally impressed on it.

Figure 8:
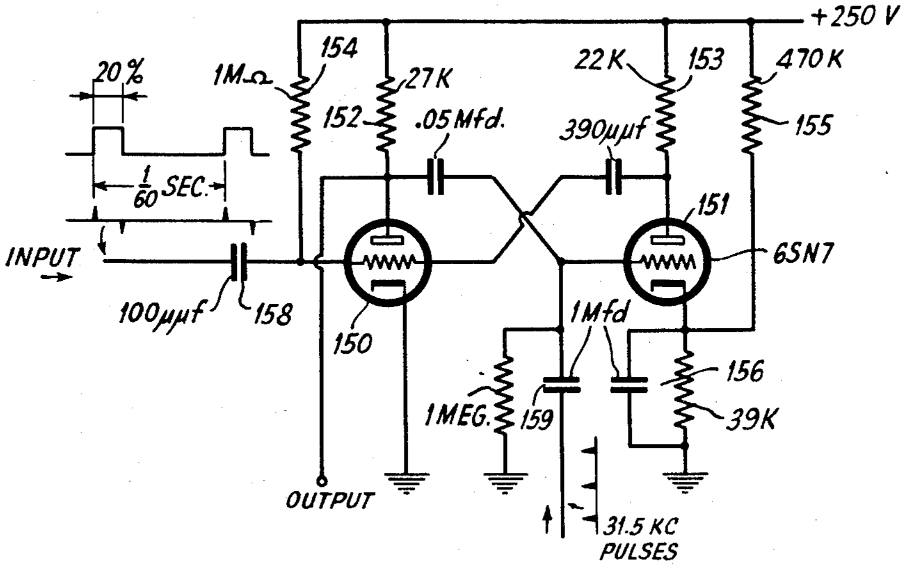
Fig. 8 is a multivibrator for producing a 60 cycle rectangular wave form having a component equal to 2H.

Referring to Fig. 8, there is shown a circuit for producing the rectangular wave form which has been referred to hereinbefore in this specification, which is of a frequency of 60 cycles and which has either the positive or the negative portion thereof, having a duration equal to substantially the scansion time of two lines of the image undergoing scansion or 2H. There is derived from the frequency dividers in the timer unit a rectangular wave form in which the positive portion of the wave comprises about 20% of its duration. This may be gotten from the circuits which have been referred to hereinbefore as having been the subject matter of the patent application of Grosdoff, Serial No. 580,446, filed March 1, 1945 (RCVD 9814), and which are shown more fully hereinafter in Figs. 10*a* and 10*b*. This type of wave form is indicated adjacent the input circuit of the apparatus. The wave form is passed through a well known form of differentiating network and there results therefrom a wave form such as is indicated immediately adjacent the aforementioned wave, such as shown, and which has a positive and negative pip each occurring once during each cycle. One of these pips may be used to drive a multivibrator as is illustrated in this figure for purposes of illustration, and values have been indicated in the drawing for the various circuit elements.

The multivibrator comprises two thermionic tubes 150 and 151 and in practice these have been the two triode sections of the 6SN7 type of tube. The plates are connected together through resistors 152 and 153 and are joined to a source of positive potential, indicated but not shown. Tube 150 has a resistor 154 connected between the plate and grid thereof, and tube 151 has a resistor 155 connected in the plate-cathode circuit thereof. One side of the cathode of tube 151 is grounded through a time constant circuit 156 and the input to the multivibrator is accomplished through condenser 158 and through condenser 159.

The multivibrator is driven by the negative pulse occurring once with each cycle of the 60 cycle wave and which has been obtained by the differentiation of the rectangular wave from the timer. Pulses or pips from the 31.5 k. c. source are impressed onto the grid of tube 151. The parameters of the circuit are chosen so that there will be a gradual tendency on the part of tube 150 to dominate the circuit. The pips impressed onto the grid of tube 151 are impressed in such fashion as to aid this effect. At the fourth pip the effect will be sufficiently great to flop the multivibrator back in the other direction, that is to say, tube 150 will achieve dominance in the circuit. Since four of these pips will represent the length of two scanning lines of the image, the output of the multivibrator will be a rectangular wave form in which one portion thereof has a duration equal to twice the scanning time of a line or 2H. This apparatus as used in actual practice is shown in Fig. 10*b*.

Referring to Fig. 9 there is shown a connection between two multivibrators such as MV2 and MV3 and wherein one of the multivibrators is flipped by the action of the other of the multivibrators connected therewith. In this figure one of the multistroke multivibrators is comprised of thermionic tubes 160 and 161, the former having the plate thereof cross-connected to the grid of tube 161 through time constant circuit 162 and condenser 163, the latter being connected serially with the time constant circuit. The plate of tube 161 is cross-connected to the grid of tube 160 through time constant circuit 164 and condenser 165, the latter being serially connected with the time constant circuit 164. The input trigger is accomplished through the series circuit consisting of resistor 166 and condenser 167, these two being connected directly to the grid of tube 160. The grid of tube 160 is grounded through resistor 168. In view of the explanation regarding Fig. 7 and further since these are well known types of multivibrators, no extended explanation of an operation should be necessary here, it being considered sufficient to say that if the tube 160 is dominating the multivibrator circuit, then an input trigger will affect the circuit so that tube 161 will become the dominant tube. The receipt of the second trigger will act to restore tube 160 to its dominant state. In actual practice the two tubes having consisted of the two triode sections of a 6SN7.

The second multivibrator consists of tubes 172 and 173 which in general form a circuit similar to that of tubes 160 and 161, that is to say, form a well known type of multivibrator.

When the multivibrator comprising tubes 160 and 161 is triggered off, or "flopped," there will be transmitted across condenser 169 and resistor 170 a pulse which will be differentiated by the condenser and resistor. Since the wave formation which has been impressed onto the differentiating circuit is rectangular in shape, there will be a positive and negative pip formed by the differentiation of the wave. The negative pip will drive the cathode of double diode 174 more negative and hence a pulse will be transmitted to the grid circuit of tube 173 and this pulse will flip the multivibrator comprised of tubes 172 and 173.

The half of the double diode which is not connected to the differentiating circuit will act to suppress any effect that the positive pip of the differentiated wave might tend to have on the multivibrator circuit consisting of tubes 172 and 173. These circuits with actual values will be shown in Fig. 11, parts *a* and *b* thereof.

Referring to Fig. 10, parts *a* and *b* thereof, there is shown a circuit diagram of a timer unit in accordance with my invention. This is a circuit diagram which represents the actual elements used and which has been shown in block diagram form in Fig. 5, hereinbefore explained. For purposes of convenience the different portions of the circuit which are presented in the block diagram of Fig. 5 have been enclosed in dash dot type of enclosure and this has been identified by the same reference numeral as also used with reference to the block units of Fig. 5. In order that the invention may be disclosed more fully, an explanatory set of values has been given to the elements comprising the circuits. Where a whole number has been shown adjacent a condenser, the value of the condenser is in terms of micromicrofarads, and where the letter *k* has been used with reference to a resistor, the letter stands for the value in terms of thousands. For example, the number 47 adjacent a condenser means that the condenser has a value of 47 micromicrofarads, and a resistor having 56*k* for instance, means that the value of the resistor is 56,000 ohms. Where the letter *m* is used in conjunction with a resistor, the value of the resistor is in megohms. In some instances values have been given directly.

This schematic diagram shows the crystal controlled oscillator 100 and the value of 94.5 k. c. frequency for the crystal has been used for convenience since it is the third harmonic of the 31.5 k. c. pips which are utilized. This particular type of oscillator forms the subject matter of U. S. Patent No. 2,269,417, granted January 6, 1942, to Murray G. Crosby. The output of the aforementioned oscillator is fed to a double triode type of oscillator tuned to 31.5 k. c. and identified by an enclosure which has been identified as 101.

The reactance tube whose function has been discussed hereinbefore in this specification has been enclosed and identified by the numeral 103. This in practice has been a 6AC7 type of tube which has been coupled to the 60 cycle lock in unit 104 through a 6SL7 type of tube which, for purposes of convenience, has been indicated as being contained in the unit 103. The 60 cycle lock-in circuit has comprised two 6AL5 types of tubes having a pair of plates tied together and having a pair of cathodes tied together as indicated in the drawing.

Figure 10A:
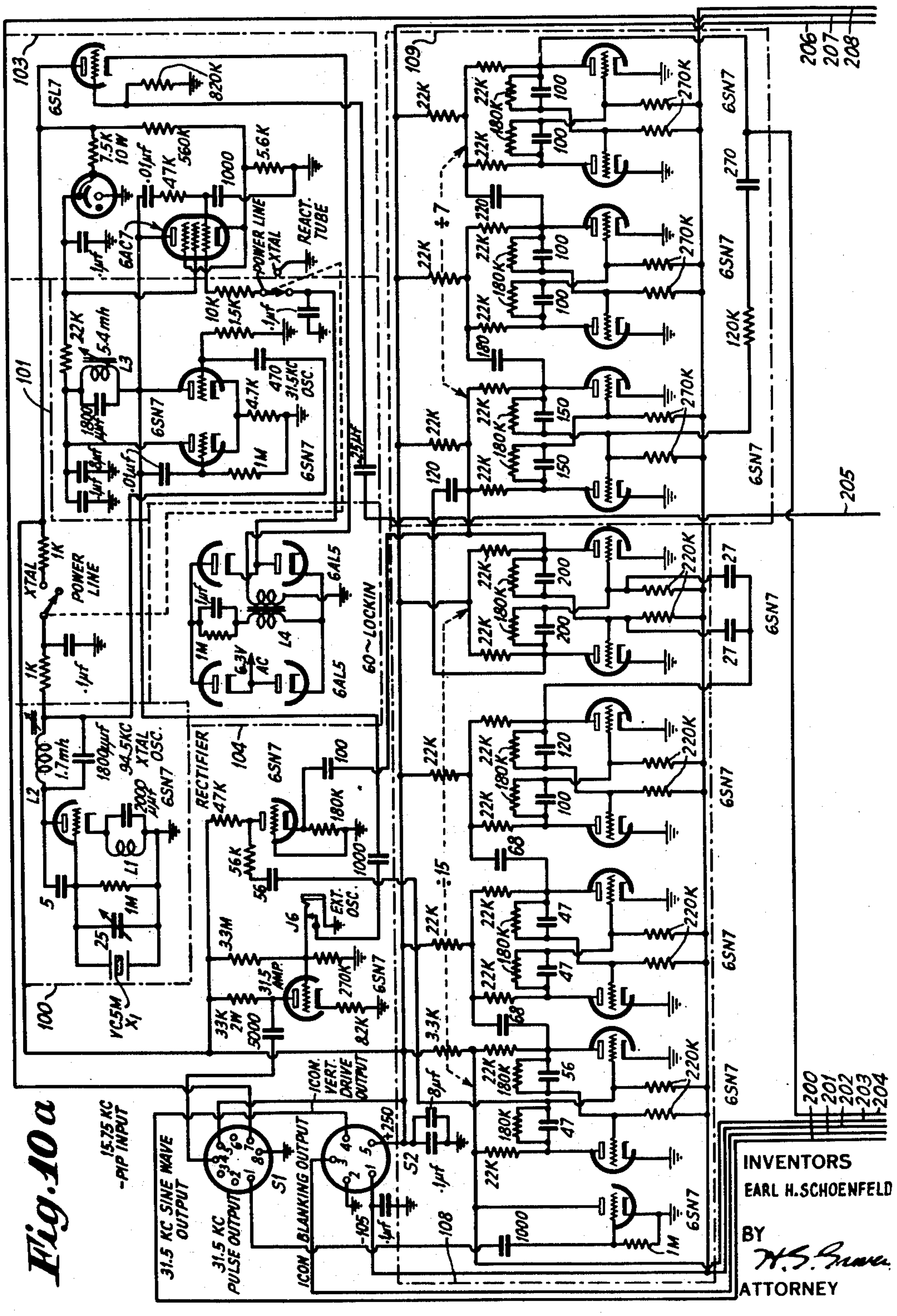
Figure 10B:
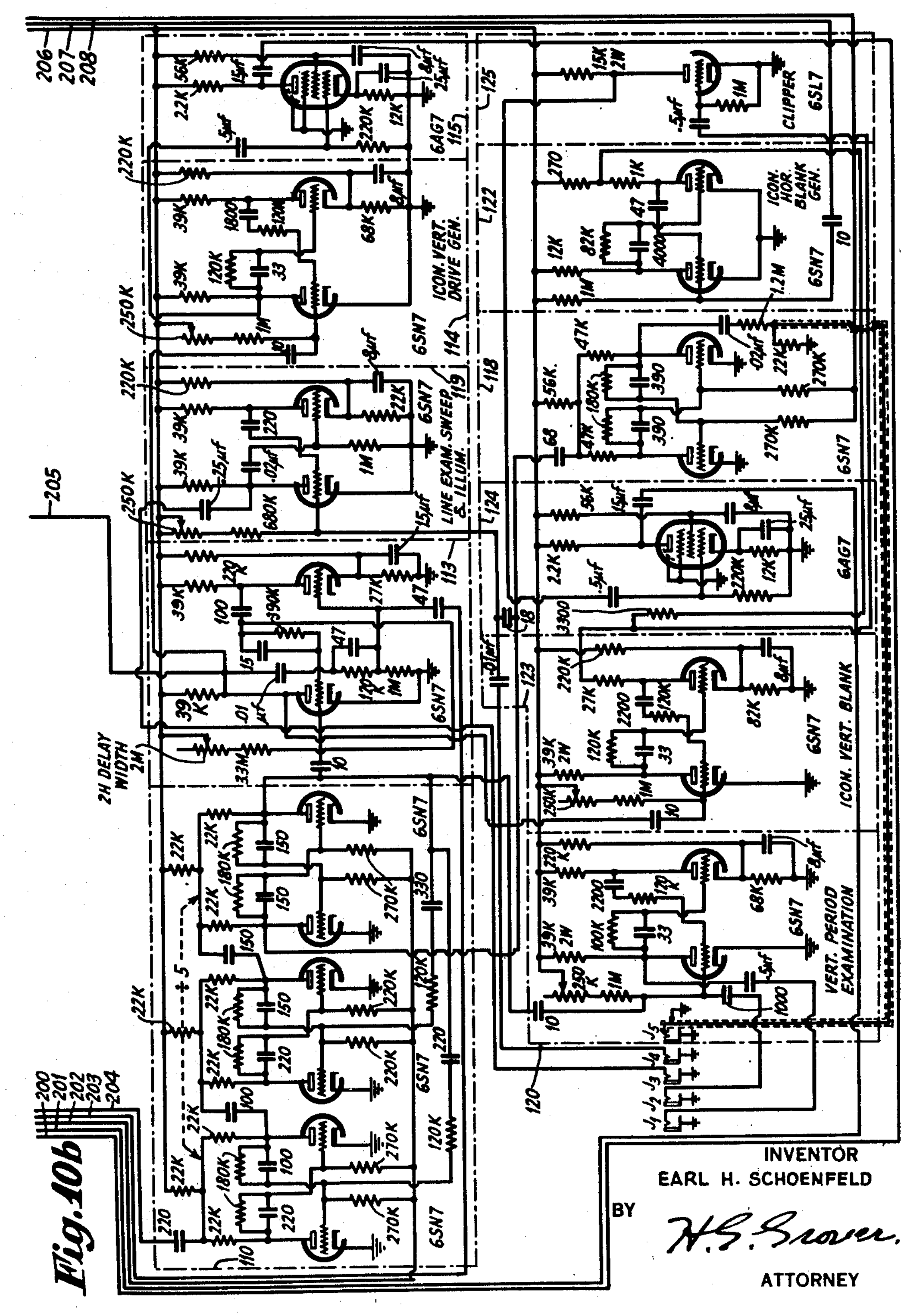

In view of the size of the circuit involved, the circuit has been split and put on two drawing sheets which have been identified as Figs. 10*a* and 10*b*.

The frequency divider units which are based on the disclosure contained in the previously pointed out Grosdoff application are indicated by the enclosures identified as 108, 109 and 110. The unit 108 is a circuit wherein the input frequency is effectively divided by 15 and has been comprised of a triode section of a 6SN7 type of tube tied in with four other 6SN7 types of tubes, the latter four with their associated circuits forming multivibrator units as indicated. The unit wherein the input frequency is effectively divided by 7 has comprised three 6SN7 types of tubes, each tube being included in a multivibrator unit and similarly the unit wherein the input frequency thereto has been divided by 5 has comprised three 6SN7 types of tubes hooked up as multivibrator units.

As has been indicated hereinbefore in this application, the principles of the operation of the frequency dividers are pointed out in the Grosdoff application hereinbefore identified. In general, a frequency divider of this nature includes a plurality of multivibrator units which are connected in cascade and which have the last multivibrator unit interconnected with an intermediate multivibrator unit for causing the counter so formed to complete its cycle of operation in response to a number of electrical pulses other than that required to complete such a cycle of operation when all of the units are connected in a loop.

The exemplary case shown in that application included four multivibrator units so interconnected as to complete the cycle of operation in response to the application thereon of ten electrical impulses. The connections are such that the various units are turned over in the usual manner in response to the number of impulses required to flip or turn over all of the units once. When the last unit is turned over, however, there is applied to at least one of the grids of a previous tube, and, in this example, one of the grids of each of the second and third units, a potential which causes these units to be skipped during the rest of the operating cycle of the counter. This negative potential is applied to the previous unit or units from one anode of the last unit through a coupling capacitor and a duo-diode. Output pulses at $\frac{1}{10}$ the frequency of the input pulses are then derived from the other anode of the last unit in this exemplary case.

In the Grosdoff application the first multivibrator has anodes 11 and 12, the second multivibrator has anodes 13 and 14, the third multivibrator has anodes 15 and 16 and the fourth multivibrator has anodes 17 and 18. The apparatus is triggered by negative pulses impressed on the common anode circuit of the first multivibrator. Anodes 11, 13, 15 and 17 are referred to as the left hand anodes and anodes 12, 14, 16 and 18 are referred to as right hand anodes. The output is taken from anode 18. Anode 17 is connected through a coupling condenser, and resistor connected serially therewith, to ground and the cathode of the duo-diode are connected to the common terminal of the condenser and resistor. One anode of the duo-diode is connected to the grid associated with anode 14 of the second multivibrator and the other anode of the duo-diode is connected to the grid associated with the anode 16 of the third multivibrator.

The cycle of operation is indicated by charts contained in the case and it is assumed that the standby state of the apparatus is such that normally current is passing through anodes 12, 14, 16 and 18. A tracing of the circuit then will show that with the second pulse current will flow through anode 13 of V2 but will not affect V3 or V4. At the beginning of the fourth pulse impressed on the first multivibrator unit the right hand anode or anode 14 of V2 will commence to draw current and the left hand anode of multivibrator 3 or anode 15 will begin to draw current, while the fourth multivibrator still is unaffected. At the beginning of the eighth pulse the effect will be that the fourth multivibrator is flipped and the anode 17 will draw current while the anode 18 will be shut off. Now this will feed back to the second and third multivibrator to keep their state from changing for the next two pulses. The ninth will be ineffective to change the state of the second multivibrator and the tenth pulse then will flip all of the multivibrators back to the initial state, thus completing the cycle.

The generator for developing vertical drive signals for the iconoscope, has been enclosed in the broken line box identified as 114, and, as has been stated hereinbefore, comprises a self-restoring type of multivibrator unit which utilized a 6SN7 type of tube. The output of the vertical drive generator is passed to a clipping circuit identified by the broken line enclosure 115 and comprises a 6AG7 type of tube connected as shown.

The unit 113 which provides the signal which is rectangular in shape and which has one portion thereof equal to substantially the length of twice the scanning time of a single line of the image, i. e. equals 2H, has comprised a 6SN7 type of tube connected as a multivibrator as shown.

The unit 118 for providing field separation and the unit 119 for providing a line examination sweep both have utilized the 6SN7 type of tube connected as a multivibrator unit as illustrated and the unit 120 which provides a signal for the vertical period examination also comprises a multivibrator hook-up of a 6SN7 type of tube as shown.

The generator for developing the iconoscope vertical blanking signals is indicated by the broken line enclosure identified as the unit 123 and comprises a 6SN7 type of tube connected as a self-restoring type of multivibrator. The output of this generator is fed to a 6SL7 type of tube connected as a clipper and identified as the unit 125. Also the output of the unit 123 is connected to the iconoscope horizontal blanking signal generator comprising unit 122 and which is a self-restoring type of multivibrator using a 6SN7 type of tube. The output of this tube in turn is connected to a 6AG7 type of tube contained within the unit 124, the output of which furnishes the composite iconoscope blanking signal.

For space reasons it has been necessary to include Fig. 10 in two sections, *a* and *b*, and where lead lines have been broken, legends have been given the lines so that they may be easily traced. Again, by holding the two sheets together, line continuation may be followed easily.

Referring to Fig. 11, sections *a* through *d* thereof, there is shown a schematic circuit diagram of the synchronizing and blanking signal generator section of the invention. For purposes of clarity and convenience, the portions thereof forming the circuits which have been the subject of some discussion hereinbefore with respect to Fig. 4 have been enclosed in dotted outline and have been identified with the same numbers as the block diagram elements of Fig. 4.

In this diagram, the blocking oscillator 10 is of the general type which has been discussed more fully hereinbefore with reference to Fig. 6. This oscillator, as indicated, is connected to supply its output to the clipper tube 11 associated therewith. This has comprised a 6SN7 type of tube with one triode section thereof comprising the blocking oscillator and the other triode section thereof acting as the clipper. Since this is a well known form of blocking oscillator, such as has been described by U. S. patent of Tolson et al., No. 2,101,520, of December 7, 1937, for instance, no elaborate description is considered necessary here, particularly in view of the fact that values of the various circuit elements have been shown adjacent these elements.

The output of the clipper tube has been taken across a cathode resistor and is impressed onto the delay line 13. In this figure, the numbers associated with the taps of the hereinbefore described delay line indicate the relative delay in microseconds in contradistinction to the showing in Fig. 4 wherein the reference numerals assigned to the various taps of the line were indicative of the number of sections of the delay line up to the particular tap.

The tap which is here identified as zero and which corresponds to the tap 73 of Fig. 4 is connected to the input of the circuit which has been enclosed and identified by the numeral 20 and which is utilized as a clipper and inverter circuit. This in actual practice has comprised one half of a 6SN7 type of tube, or, in other words, one of the triodes of the 6SN7 is utilized for this circuit. The clipper itself is of a known form and the principles thereof are well known.

The output of the clipper is taken from the anode circuit thereof and is impressed onto the circuit identified by the reference numeral 21 and which comprises the synchronizing generator. The pulse from the clipper will "flip" this circuit, which is a multivibrator arrangement using a 6AC7 type of tube and a 6AG7 type of tube. This is the so-called "flip-flop" type of multivibrator, or as it is termed, a non-self-restoring or a multistroke type of multivibrator. The signal from the output of the clipper 20 will initiate the leading edge of the wave taken from the multivibrator 21, and all of the synchronizing signals for the receiver apparatus are generated by the multivibrator 21.

In the generation of the horizontal synchronizing signals, pips from the tap identified by the numeral 5.08 (indicating, for instance, 5.08 microseconds delay from tap *o* on the delay line 13) and corresponding to the tap 114 in Fig. 4 are impressed onto the gate circuit which is identified by the reference numeral 25. This gate 25 controls the generation of the rear edge of the horizontal synchronizing signals. The gate circuit 25 may be termed a form of mixer circuit in which the tube thereof is impervious to current flow if either of the signals impressed thereon is sufficiently negative in value to carry the tube to a cut-off state. Therefore, by making one of the control grids sufficiently negative the gate may be closed to passage of the pips therethrough from the delay line. The gate comprises a 6SA7 type of tube connected in the manner shown. When the gate is "open" or that is to say, pervious to current flow, the pips from the aforementioned tap on the delay line pass through the gate and are passed from the gate to the circuit 21 where these pips establish the rear or trailing edge of the horizontal synchronizing signals whose leading edge has been established by pips from the zero tap on delay line 13.

The circuit 22 is a gate circuit using a 6SN7 type of tube and having one of the plates thereof tied to the control grids of the triode sections of the tube in the manner indicated. Accordingly, for reasons set forth earlier in this specification, only alternate horizontal synchronizing signals from the generator 21 will pass to and through the circuit 22 whereas all of the equalizing and vertical synchronizing signals will pass through.

Consider the development of the equalizing and vertical synchronizing signals. Pips or pulses from the tap identified as the —4.44 tap on the delay line, which corresponds to the tap 17 of Fig. 4, are impressed onto the gate circuit 15 which feeds pips to the 6 counter circuit 33 and comprises a 6L7 type of tube associated with a biasing diode which is half of a 6AL5 type of tube. This circuit as previously pointed comprises the gate for the 6 counter which is the circuit 33, which, in turn, is under the control of multivibrator MV1 which is the circuit 44. At the time $t_1$, multivibrators MV1 and MV2, which are the circuit elements 44 and 38 respectively, will be turned on and gate 15 will become conducting and the 6 counter will commence to operate.

The 6 counter is shown as the circuit 33 and comprises three 6SN7 type of tube each having the dual triode portions thereof cross-connected as a multivibrator and which are mutually interrelated in action. This circuit has been made in accordance with the principles of the Grosdoff application hereinbefore referred to. The output of the 6 counter passes to an inverting and amplifying circuit 35 which has comprised one of the triode sections of a 6SN7 type of tube and the output of the latter circuit is connected to the "off" terminals of the multivibrator MV2, MV3 and MV4, which are controlled thereby at appropriate intervals such as has been explained hereinbefore.

The multivibrator MV2 is identified as the circuit 38 and has been explained in principle hereinbefore in this specification with reference to Fig. 9. It is identified as the circuit element 38 and comprises a duel triode tube of the 6SN7 type having the triodes cross-connected as a multistroke multivibrator which becomes self-restoring after a predetermined period of time. Associated with this circuit is a double diode tube of the 6H6 type for the purpose which has been explained hereinbefore.

While MV2 is in one portion of its cycle of operation, that is to say has been "flipped" by the impression of a pulse thereon the gate circuit 24 will be open or that is to say pervious to current flow. The circuit 24 is a gate circuit for establishing the rears of the equalizing signals whose front edges have been established by pips from the zero tap on the delay line of this figure. This gate comprises a 6L7 type of tube with an associated biasing diode which, in practice, has been one of the triode sections of a 6SN7 type of tube wherein the plate and grid are tied together. Since the gate 24 is under the control of multivibrator MV2, equalizing signals will be generated only while MV2 is in the "on" position which is during time $t_1t_2$. Since MV2 in turn is controlled by the 6 counter, it will be apparent that equalizing signals will be generated only during the operating cycle of MV2 and also MV4, the latter being connected also so as to control the gate circuit 24. Since MV2 and MV4 are similar multivibrators, as well as MV3, no extended explanation of these multivibrators is given at this point.

In the generation of the vertical synchronizing signals, the multivibrator MV3 controls the gate circuit 16 which comprises a 6L7 type of tube having a bias diode (herein shown as half of a 6SN7 triode with the grid and plate electrodes connected together) associated therewith. Pips from the —4.44 tap are passed to the gate circuit 16 which, when it is "open," in turn passes these pips to the synchronizing generator circuit 21. Since the multivibrator MV3 is under the control of the 6 counter circuit 33, the vertical synchronizing signals will be generated only during the time between $t_2$ and $t_3$.

The multivibrator MV1 which has been identified as circuit element 44 identifies the time $t_1$ to $t_4$ during which the equalizing and vertical synchronizing signals are developed. This multivibrator is turned on by the circuits 42 and 43, the latter being a triggering circuit. The circuit 42 has impressed thereon pips from the —0.4 tap of the delay line which corresponds to the tap 68 of the delay line of Fig. 4. Also impressed on circuit 42 is the negative pulse having a "2H" value and which is derived from the timer unit. In this figure, circuits 42 and 43 have been combined and comprise a 6AC7 type of tube associated with an appropriate differentiating circuit for differentiating the negative 2H pulse. The output of these two circuits is used to initiate the triggering of the multivibrators consisting of circuits 38, 39, 40 and 44.

The fact that twice too many horizontal synchronizing signals are developed has been brought out hereinbefore. The synchronizing signals are developed in the proper number by the deletion of alternately generated signals during the time period between $t_4$ and $t_1$. This is accomplished in the following manner. The signals from the synchronizing generator circuit 21 are passed through the gate circuit 22 which has been referred to hereinbefore in this specification. This gate is under the control of circuits 28 and 29 which allow the generation of equalizing and vertical synchronizing signals during the time $t_1$ and $t_4$ without deletion and act to delete alternate signals during the time between $t_4$ when equalizing pulses cease and time $t_1$ when such pulses again start. This is accomplished by providing a multivibrator to generate the deleting signal, and this multivibrator comprises the circuit 28, and further to render the signals from the multivibrator ineffective during the period $t_1$ to $t_4$. The latter is accomplished by the gate circuit 29 which is under the control of multivibrator MV1, the latter being circuit 44. The circuit 28 comprises a multistroke type of multivibrator utilizing the triode sections of a 6SN7 type of tube. The output wave, which is rectangular in shape, is generated under the control of pips from the —5.8 tap on the delay line 13. These pips first are passed to an inverting and amplifying circuit 27 which comprises a triode, and the output thereof is passed to the multistroke type of multivibrator comprising the circuit 28. This multivibrator has comprised a 6SN7 type of tube having the triode elements thereof cross-connected. The deleting signals then are passed to gate 22.

In the generation of the horizontal blanking signals, there is provided a gate circuit 18 which comprises a 6SA7 type of tube having associated therewith a bias diode which, in practice, has been one of the diode elements of a 6AL5 type of tube. Pips from the —2.16 tap on the delay line are impressed onto one of the control grids of the gating tube. The output of the deleting generator circuit 28 is impressed onto the gate to determine the spacing of the pips passing through. Since alternate pips will be deleted, the output of gate 18 will be a series of pips having a frequency of 15.75 kilocycles for the assumed 525 line transmission with 30 double interlaced frames per second. These pips are impressed onto the horizontal blanking signal generator which is circuit 61. The circuit 61 is a self-restoring type of multivibrator, as above described, using a 6SN7 type of tube having the triode elements thereof cross-connected as a multivibrator. The output of circuit 61 is mixed with the signals from the vertical blanking signal generator 63.

The latter generator also comprises a self-restoring type of multivibrator using a 6SN7 type of tube and which has impressed on one of the portions thereof positive signals of a duration of 2H. As shown, one of the resistors is made variable so that the vertical blanking width may be adjusted at will.

The necessary vertical and horizontal blanking signals are passed to a clipping and output circuit 66 comprising one of the triode portions of a 6SN7 type of tube feeding into a 6AG7 type of tube. The output of the latter comprises the composite blanking signal for the kinescope.

Signals from the deletion multivibrator circuit 28 also are passed to a pair of gate circuits 26 and 30 so as to delete alternate pips or pulses impressed onto these gates. The circuit 26 has impressed thereon pips or pulses from the 5.08 tap on the delay line, which corresponds to the 114 section tap of Fig. 4. The gate 26 comprises a 6SA7 type of tube having the output thereof passed to the horizontal driving signal generator for the iconoscope and which is identified as circuit 52. The gate circuit 30 which is provided with pips to act as the "off" triggers for the horizontal drive generator 52 which has impressed thereon both pips from the tap −0.4 and deleting pulses from the circuit 28. Accordingly, alternate pips will be deleted and alternate pips will pass through to establish the "on" triggers for the horizontal driving signal generator 52.

The horizontal driving signal generator 52 comprises a driven type of multivibrator generator utilizing the triode elements of a 6J6 type of tube. Signals from the circuit 30 will establish the leading edge of the output signal of the generator and signals from the circuit 26 will establish the rear edge of the output signals of the generator. Since alternate pulses which drive the circuits 26 and 30 were deleted, the output of the horizontal drive generator will comprise a wave having a frequency of 15.75 kilocycles. The output of the horizontal drive generator is passed to a clipping circuit 53 which comprises one triode section of a 6SN7 type of tube, the output of which feeds into a 6AG7 type of tube. The output of the latter comprises the horizontal driving signals for the iconoscope.

The enclosures of Figs. 10 and 11, which correspond to the block diagrams of Figs. 4 and 5, have been made only for purposes of convenience and to direct the attention of one skilled in the art to particular circuits which will be well recognized by him.

What I claim is:

1. Apparatus for developing synchronizing signals comprising a generator, means for developing uniformly recurring control signals, time delay means responsive to said recurring control signals, means for impressing a uniformly recurring signal bearing a definite time relationship with the recurring control signal onto said generator to initiate each of the signals produced by the generator, a plurality of gate circuits, means for impressing the signal occurring at one of a plurality of points on said delay means onto a gate circuit, switching means connected to said gate circuits, means to selectively operate said switching means under the control of signals developed from the uniformly recurring control signal, and means for impressing the output of said gate circuits onto said generator to control the duration of each wave produced by the generator.

2. Apparatus in accordance with claim 1 wherein said switching means comprise a plurality of interconnected multivibrators and wherein the cycle of operation of said multivibrators occurs at field frequency.

3. Apparatus for generating synchronizing signals for use with television apparatus comprising a generator, means for developing a uniformly recurring control signal, time delay means responsive to said uniformly recurring control signal, means to impress signals appearing at a predetermined point on the time delay means onto said generator to uniformly establish the initiation of all of the waves produced by said generator, a plurality of gate means, a plurality of multivibrator means connected to said gate means so as to control the operating state thereof, means connecting an individual point on said time delay means onto selected gate means, means connecting the output of all of said gate means to the generator, means to trigger one of said multivibrators at a field repetition frequency and for a predetermined interval of time, and means mutually interconnecting said multivibrators in such manner that said multivibrators are operated sequentially whereby the gate circuits are individually opened sequentially and the signal from the points on the time delay means are impressed onto the generator to establish the rear edges of each of the waves developed by the generator.

4. Apparatus for generating electrical signals comprising means to generate a recurring control signal of short duration, delay line means, means for impressing said recurring control signal onto said delay line whereby signals having a predetermined phase relationship each with the other may be derived from various portions of the delay line, an electric generator, means for impressing signals from one portion of said delay line onto said generator to establish the leading edge of the wave formations produced by the generator, a plurality of gate circuits, counter circuit means connected to respond to said recurring short duration signals, means operable by said counter circuit to control the conducting state of at least a part of the gate circuits, means for impressing individual signals derived from the delay line means onto individual gate circuits, and means electrically connecting said gate circuits to the electrical generator whereby the trailing edges of at least a portion of the signals generated by said generator are established, as well as the number of signals so produced.

5. Electrical signal producing apparatus comprising means for developing pips of a predetermined frequency, electrical delay line means connected to respond to the developed pips, electrical signal generating means, means for impressing signals from a predeterminable section of said delay line means upon the signal generating means to establish one of the edges of the signals generated thereby, counter circuit means responsive to said recurring control signals, a plurality of multivibrator units, means interconnecting said multivibrators whereby said multivibrators are mutually operable, means to initiate the operation of said multivibrators at field repetition frequency, means for impressing said pips onto said counter circuit, means connecting the counter circuit to at least one of said multivibrator means to control the operating state thereof, gate means, means to control said gate means in accordance with the operating state of said multivibrators, means to electrically impress pips from predetermined sections of said delay line onto said gate circuits, and means for impressing signals from said gate circuits onto said electrical signal generating means to control the generation of the other of the edges of said produced signals.

6. Apparatus for producing synchronizing signals for television apparatus comprising a synchronizing signal generator, means for generating a uniformly recurring set of electrical pips, time delay means responsive to said electrical pips, means to impress signals occurring at one point on said time delay means onto said synchronizing signal generator to establish one of the edges of each of the waves produced thereby, a plurality of gate means, means for impressing pips occurring at an individual point onto each of said gate means whereby each of said gate means may allow passage therethrough of signals from one individual point on said time delay means, a plurality of multivibrators interconnected so that said multivibrators are operated sequentially by initiating the operation of one of the multivibrators, means connecting each of said multivibrators to selected gate circuits, counter circuit means, gate means connected to said counter circuit means and to a point on said time delay means, a switching means for controlling the operating state of the latter gate means, means to operate said switching means recurrently at the field frequency, means connecting said counter circuit means to said multivibrators, means for impressing the output of the gate means connected to said multivibrators onto the synchronizing generator to establish the other edge of each of the waves produced by said synchronizing generator, and means to initiate the operation of the multivibrator means recurrently at field frequency.

7. Apparatus in accordance with claim 6 wherein said synchronizing signal generator comprises a multi-strike multivibrator.

8. In television apparatus, in combination, means for generating uniformly recurring electrical pips, time delay means responsive to said electrical pips, counter circuit means, gate circuit means connected to said counter circuit and responsive to signals impressed thereon from predetermined points on said time delay means, a first multivibrator, means for triggering said multivibrator recurrently, a plurality of multivibrators each connected to said counter circuit and serially connected with each other whereby the output of the counter circuit may influence the operating state thereof, means to trigger the first of said plurality of multivibrators recurrently, means interconnecting said plurality of multivibrators whereby the multivibrators are triggered sequentially and are returned to their initial state under the influence of said counter circuit, and means connecting the last of the series of multivibrators to the first multivibrator whereby the return of the last multivibrator to its initial operating state acts to return the first multivibrator to its initial operating state and to open the switching means connected to the counter circuit.

9. Apparatus for producing electrical signals comprising electrical signal generating means comprising a multistroke multivibrator, means for developing electrical pips of a predetermined frequency and short duration, electrical delay line means connected so as to be responsive to the developed pips onto said delay line means, means for impressing signals from a predeterminable section of said delay line means onto said electrical signal generating means to establish one of the edges of each of the signals generated thereby, gate means, means to open and close said gate means sequentially, means for impressing onto said gate means pips from predetermined sections of the delay line means, means for impressing the output of the gate means onto the electrical signal generating means to establish the other edge of the signals generated thereby, a second signal generator, means to produce in said second signal generator electrical waves having a predetermined phase relationship with those produced by the first signal generator and controlled by the pips affecting the first signal generator, and output means for additively combining the signals from both of said electrical signal generating means.

10. In a television signal generating apparatus, a first signal generator, means for developing uniformly recurring electrical pips from the output of said first signal generator, time delay means responsive to said electrical pips, a synchronizing signal generator, means to generate horizontal synchronizing and vertical synchronizing signals by said synchronizing signal generator under the influence of recurring pips occurring at points on the time delay means, a second generator, means to generate electric waves by said second generator under the control of the signals occurring at one point on the time delay means, and means for effectively adding the output of the second generator during the horizonal scanning interval with that of the synchronizing signal generator to delete horizontal synchronizing signals generated at a time other than during the proper horizontal synchronizing signals.

11. Apparatus in accordance with claim 10 wherein said second generator comprises a multistroke multivibrator.

12. In a television signal generating apparatus, a first signal generator, means for delevoping uniformly recurring electrical pips from the output of said first signal generator, time delay means responsive to said electrical pips, a synchronizing signal generator, means to generate horizontal synchronizing and vertical synchronizing signals by said synchronizing signal generator under the influence of recurring pips occurring at points on the time delay means, a second generator, means to generate electric waves by said second generator under the control of the signals occurring at predetermined points on the time delay means whereby signals from the synchronizing signal generated may be used to synchronize a television receiving apparatus with a transmission apparatus and signals from said second generator may occur in definite time relationship to the synchronizing signals and may be used for horizontal blanking signals.

13. Apparatus in accordance with claim 12 wherein there is provided a third generator triggered by a wave form occurring at field frequency and derived from said uniformly recurring pips and wherein said third generator output signal bears a definite time relationship to the vertical synchronizing signals and may be used as vertical blanking signals for television receiving apparatus.

14. In television apparatus means for developing a uniformly recurring series of electrical pips of short duration, a first signal generator, time delay means responsive to said uniformly recurring pips, means for impressing the signals occurring at one point of the time delay means onto the first signal generator to establish one of the edges of all the waves generated thereby, a plurality of gate circuits, means for impressing signals occurring at differing points on the time delay means onto said gate circuits, means for impressing the output of said gate circuits onto said first signal generating means, a plurality of switching means connected to said gate circuits, means for closing said switching means sequentially for predetermined intervals to allow the passage of signals through said gate circuits in a predetermined sequence and for predetermined lengths of time to establish the other edge of all of the signals developed by said first signal generator, second, third, fourth and fifth signal generators, and means for controlling the initiation of all of the signals produced by all of said generators under the influence of signals derived from said uniformly recurring pips.

15. Apparatus in accordance with claim 14 wherein said second signal generator produces a properly phased horizontal blanking signal for use with receiving apparatus.

16. Apparatus in accordance with claim 14 wherein said second signal generator produces a properly phased vertical blanking signal for use with receiving apparatus.

17. Apparatus in accordance with claim 14 wherein said second signal generator produces a properly phased horizontal transmitter driving signal for use with receiving apparatus.

18. Apparatus in accordance with claim 14 wherein said second signal generator produces a properly phased vertical transmitter driving signal for use with receiving apparatus.

19. Apparatus for developing synchronizing signals comprising a generator, means for developing uniformly recurring control signals, time delay means responsive to said recurring control signals, means for impressing a uniformly recurring signal bearing a definite time relationship with the recurring control signal onto said generator to initiate each of the signals produced by the generator, means for impressing the recurring signal produced at at least one point on the time delay means onto said generator to terminate each of the produced signals and to thereby establish the duration of each signal produced by the generator, a plurality of gate circuits, means to impress signals appearing at a plurality of points on said time delay means onto said gate circuits, each gate having the signal appearing at one of the points of the time delay means impressed thereon, means to impress the output of the gate circuits onto said generator to control the duration of each of the waves generated thereby and means to selectively operate the gate circuits.

EARL H. SCHOENFELD.

REFERENCES CITED

The following references are of record in the file of this patent:

UNITED STATES PATENTS

| Number | Name | Date |
|---|---|---|
| 2,231,792 | Bingley | Feb. 11, 1941 |
| 2,256,529 | Seeley | Sept. 23, 1941 |
| 2,256,530 | Seeley | Sept. 23, 1941 |
| 2,258,943 | Bedford | Oct. 14, 1941 |
| 2,298,863 | Bartelink | Oct. 13, 1942 |
| 2,298,864 | Bartelink | Oct. 13, 1942 |
| 2,350,536 | Schlesinger | June 6, 1944 |
| 2,363,809 | Schade | Nov. 28, 1944 |
| 2,401,405 | Bedford | June 4, 1946 |